(12) United States Patent
Kasai et al.

(10) Patent No.: US 8,379,887 B2
(45) Date of Patent: Feb. 19, 2013

(54) ACOUSTIC SENSOR

(75) Inventors: Takashi Kasai, Kusatsu (JP); Kazutoshi Wakao, Higashiomi (JP); Takeshi Matsuo, Konan (JP); Takayoshi Onishi, Higashiomi (JP); Akane Takahashi, Higashiomi (JP)

(73) Assignee: OMRON Corporation, Kyoto (JP)

( * ) Notice: Subject to any disclaimer, the term of this patent is extended or adjusted under 35 U.S.C. 154(b) by 270 days.

(21) Appl. No.: 12/663,130

(22) PCT Filed: Jan. 30, 2008

(86) PCT No.: PCT/JP2008/051398
§ 371 (c)(1),
(2), (4) Date: Mar. 23, 2010

(87) PCT Pub. No.: WO2008/149570
PCT Pub. Date: Dec. 11, 2008

(65) Prior Publication Data
US 2010/0175477 A1   Jul. 15, 2010

(30) Foreign Application Priority Data
Jun. 4, 2007   (JP) ................................. 2007-148433

(51) Int. Cl.
*H04R 25/00* (2006.01)
(52) U.S. Cl. ........................................ 381/174; 381/191
(58) Field of Classification Search ................... 381/174, 381/191; 438/53
See application file for complete search history.

(56) References Cited

U.S. PATENT DOCUMENTS

2007/0154040 A1* 7/2007 Chen ........................... 381/174
2007/0261910 A1* 11/2007 Kasai et al. ................... 181/142

FOREIGN PATENT DOCUMENTS

| JP | 8-111535 A | 4/1996 |
|----|------------|--------|
| JP | 9-18021 A | 1/1997 |
| JP | 2004-506394 A | 2/2004 |
| JP | 2004-96543 A | 3/2004 |
| JP | 2004-128957 A | 4/2004 |
| JP | 2006-020313 A | 1/2006 |
| JP | 2006-157863 A | 6/2006 |
| WO | 2006/049100 A1 | 5/2006 |

OTHER PUBLICATIONS

International Search Report for PCT/JP2008/051398 mailed Mar. 25, 2008 (4 pages).
Written Opinion of ISA for PCT/JP2008/051398 mailed Mar. 25, 2008 (9 pages).

(Continued)

*Primary Examiner* — Davetta W Goins
*Assistant Examiner* — Amir Etesam
(74) *Attorney, Agent, or Firm* — Osha Liang LLP

(57) ABSTRACT

A vibrating electrode plate that senses a sound pressure faces a counter electrode plate to constitute a capacitance type acoustic sensor. In the counter electrode plate, acoustic perforations are opened in order to pass vibration, and plural projections are provided on a surface facing the vibrating electrode plate. An interval between the projections is decreased in a region where the vibrating electrode plate has high flexibility to easily generate local sticking with the counter electrode plate. The interval between the projections is increased in a region where the vibrating electrode plate has low flexibility to hardly generate local sticking with the counter electrode plate. The projections thus arranged prevent firm fixing of the vibrating electrode plate to the counter electrode plate and interruption of vibration of the vibrating electrode plate.

8 Claims, 27 Drawing Sheets

OTHER PUBLICATIONS

Measurement of the Surface Force in Micro Structures and Its Reduction Shigeki Tsuchitani et al.,; Intellectual Property Office, Hitachi, Ltd., Hitachi 1994 (7 pages).

Patent Abstract for JP2006-157863 published Jun. 15, 2006 (1 page).
Japanese Office Action for Japanese Application No. 2007-148433, mailed on Feb. 7, 2012, and English translation thereof (5 pages).

* cited by examiner (a)

(b)

ACOUSTIC SENSOR

TECHNICAL FIELD

The present invention relates to an acoustic sensor, particularly to an acoustic sensor that detects a sound pressure propagating through gas or liquid, that is, acoustic vibration.

BACKGROUND ART

Japanese Unexamined Patent Publication No. 2006-157863 (Patent Document 1) discloses an acoustic sensor as one example.

This acoustic sensor has a structure in which a vibrating electrode plate (movable electrode) and a counter electrode plate (fixed electrode) face each other with a micro gap (air gap) provided therebetween. Because the vibrating electrode plate is formed by a thin film having a thickness of about 1 μm, when the vibrating electrode plate receives a sound pressure, the vibrating electrode plate vibrates microscopically in response to vibration of the sound pressure. A gap between the vibrating electrode plate and the counter electrode plate changes when the vibrating electrode plate vibrates. Therefore, acoustic vibration is detected by detecting a change in electrostatic capacitance between the vibrating electrode plate and the counter electrode plate.

The acoustic sensor is produced by utilizing a micromachining (semiconductor microfabrication) technique, and thus is of high sensitivity with micro dimensions such that one side thereof is several millimeters in a planar view.

However, in such an acoustic sensor, as illustrated in FIG. 1, a vibrating electrode plate 12 is firmly fixed to counter electrode plate 13 during production or use thereof (hereinafter, a state or a phenomenon, in which part or a substantially whole of the vibrating electrode plate is firmly fixed to the counter electrode plate to eliminate the gap, is referred to as sticking). When the vibrating electrode plate 12 sticks to the counter electrode plate 13, an acoustic sensor 11 cannot detect acoustic vibration because the vibration of the vibrating electrode plate 12 is obstructed.

FIGS. 2(a) and 2(b) are schematic diagrams illustrating a cause of generation of the sticking in the acoustic sensor 11, and FIGS. 2(a) and 2(b) are enlarged views of a portion corresponding to the portion X of FIG. 1. Because the acoustic sensor 11 is produced by utilizing the micromachining technique, for example, water 14 invades between the vibrating electrode plate 12 and the counter electrode plate 13 in a cleaning process after etching. Even in use of the acoustic sensor 11, moisture sometimes remains between the vibrating electrode plate 12 and the counter electrode plate 13 or the acoustic sensor 11 gets wet.

On the other hand, because the acoustic sensor 11 has micro dimensions, the gap between the vibrating electrode plate 12 and the counter electrode plate 13 is only several micrometers. Further, in order to enhance the sensitivity of the acoustic sensor 11, the vibrating electrode plate 12 has a thin film thickness of about 1 μm, and thus a spring property of the vibrating electrode plate 12 is weakened.

Therefore, in the acoustic sensor 11, sometimes the sticking is generated through a two-stage process as described below. In the first stage, as illustrated in FIG. 2(a), when the water 14 invades between the vibrating electrode plate 12 and the counter electrode plate 13, the counter electrode plate 13 attracts the vibrating electrode plate 12 by a capillary force P1 or a surface tension of the water 14.

In the second stage, after evaporation of the water 14 between the vibrating electrode plate 12 and the counter electrode plate 13, the vibrating electrode plate 12 sticks to the counter electrode plate 13 and this state is retained. An intermolecular force, an intersurface force, and an electrostatic force, which act between a surface of the vibrating electrode plate 12 and a surface of the counter electrode plate 13, can be cited as an example of a force P2 that firmly fixes the vibrating electrode plate 12 to the counter electrode plate 13 to retain the vibrating electrode plate 12 even after the water 14 evaporates. As a result, the vibrating electrode plate 12 is retained while sticking to the counter electrode plate 13, thereby disabling the acoustic sensor 11.

In the above description, the vibrating electrode plate 12 sticks to the counter electrode plate 13 by the capillary force of invading water in the first stage. However, sometimes the vibrating electrode plate 12 sticks to the counter electrode plate 13 due to a liquid other than the water, or sometimes a large sound pressure is applied to the vibrating electrode plate and the vibrating electrode plate thus sticks to the counter electrode plate. Further alternatively, the vibrating electrode plate sometimes generates static electricity so as to stick to the counter electrode plate, thereby causing the process of the first stage. In the following description, it is assumed that the vibrating electrode plate sticks to the counter electrode plate due to the water.

In order to reduce the sticking, an elastic restoring force Q of the vibrating electrode plate 12 is increased to overcome the capillary force P1 of the water 14 in the first stage or the retention force P2 in the second stage so that the vibrating electrode plate 12 is restored to the original state. In order to increase the elastic restoring force Q of the vibrating electrode plate 12, the film thickness of the vibrating electrode plate 12 may be increased to enhance the spring property. However, when the elastic restoring force Q of the vibrating electrode plate 12 is increased, the vibrating electrode plate 12 becomes hard to vibrate, which results in a problem in that the sensitivity of the acoustic sensor 11 degrades.

Alternatively, in the first stage, the sticking can be reduced in a case where the capillary force P1 is smaller than the elastic restoring force Q of the vibrating electrode plate 12. The capillary force P1 is increased with decreasing the gap between the vibrating electrode plate 12 and the counter electrode plate 13. Therefore, the gap is widened to decrease the capillary force P1. However, when the gap between the vibrating electrode plate 12 and the counter electrode plate 13 is widened, the thickness of the acoustic sensor 11 is increased to obstruct miniaturization of the acoustic sensor 11. The sensitivity of the acoustic sensor 11 also degrades.

Therefore, as illustrated in FIG. 3, in the acoustic sensor disclosed in Patent Document 1, the sticking between the vibrating electrode plate 12 and the counter electrode plate 13 is reduced by providing many projections 15 on the surface of the counter electrode plate 13 which faces the vibrating electrode plate 12. The projections are generally disposed at equal intervals on the entire counter electrode plate. It is well known that the retention force P2 between the vibrating electrode plate 12 and the counter electrode plate 13 has a correlation with a contact area between the electrode plates 12 and 13, and the retention force P2 is decreased with decreasing the contact area therebetween. Accordingly, when the projections 15 thinned as much as possible are provided on the counter electrode plate 13, the contact area between the vibrating electrode plate 12 and the counter electrode plate 13 (projections 15) is reduced to weaken the retention force P2. Therefore, the sticking of the vibrating electrode plate 12 is hardly generated.

According to the description of Non-Patent Document 2, because a ratio of a surface area to a mass is increased in a micro structure, an intersurface force acting between member surfaces plays a crucial role, and in particular a micro element having a diaphragm does not work occasionally with the diaphragm and a counter substrate stick to each other by the intersurface force. Non-Patent Document 2 further describes that the sticking of a cantilever can be reduced by providing a projection (stopper) on the cantilever.

Patent Document 1: Japanese Unexamined Patent Publication No. 2006-157863

Non-Patent Document 1: Shigeki Tsuchiya and five other, "Measurement of Intersurface Force and Reduction of Intersurface Force in Micro Structure", Collection of Papers of the Society of Instrument and Control Engineers, vol. 30, No. 2, pp. 136-142 (1994), The Society of Instrument and Control Engineers, Japan

DISCLOSURE OF THE INVENTION

Problem to be Solved by the Invention

However, as a result of repetitive experiments in which the interval between the projections provided on the vibrating electrode plate is changed in the acoustic sensor, when the sticking of the vibrating electrode plate is prevented by providing the projections, it is necessary to adjust the interval between the projections to a proper value.

FIGS. 4(a) to 4(c) are views schematically illustrating the vibrating electrode plate 12 in a case where the interval between the projections 15 is excessively small, a case where the interval between the projections 15 is proper, and a case where the interval between the projections 15 is excessively large, respectively. FIG. 4(b) illustrates the case where an interval d between the projections 15 is proper. In this case, even if the vibrating electrode plate 12 sticks to the counter electrode plate 13 due to water, because the contact area between the projections 15 and the vibrating electrode plate 12 is small as indicated by an alternate long and two short dash line of FIG. 4(b), the retention force P2 is smaller than the elastic restoring force Q of the vibrating electrode plate 12 when the water evaporates. Therefore, as indicated by a solid line of FIG. 4(b), the vibrating electrode plate 12 is restored to the original state by the elastic restoring force Q thereof.

On the other hand, as illustrated in FIG. 4(a), when the interval d between the projections 15 is smaller than a proper interval, even if the projections 15 are each thinned to reduce the leading-end area, there is a limitation to the miniaturization of the leading-end surface of the projection 15. Thus, the sum of the leading-end areas becomes large in all the projections 15. Therefore, in the this case, the vibrating electrode plate 12 sticks to the leading-end surfaces of the projection 15 in a substantially whole or wide region, and the vibrating electrode plate 12 sticks to the projections 15. The state in which the vibrating electrode plate 12 sticks to the leading-end surfaces of many of the projections 15 as illustrated in FIG. 4(a) is referred to as whole sticking.

As illustrated in FIG. 4(c), when the interval d between the projections 15 is larger than the proper interval, even if the vibrating electrode plate 12 abuts on the projections 15, part of the vibrating electrode plate 12 drops between the adjacent projections 15 and comes into contact with the counter electrode plate 13. In the state where the vibrating electrode plate 12 sticks to the counter electrode plate 13, the contact area becomes considerably larger than the leading-end areas of the projections 15 even if the vibrating electrode plate 12 sticks to the counter electrode plate 13 at one point. Therefore, the vibrating electrode plate 12 is firmly fixed to the counter electrode plate 13. The state in which the vibrating electrode plate 12 sticks partly to the counter electrode plate 13 between the projections 15 as illustrated in FIG. 4(c) is referred to as local sticking.

When the whole sticking and the local sticking are compared to each other, generally the whole sticking is caused easier than the local sticking. Accordingly, when the interval between the projections is determined in a designing stage, the interval between the projections is better to be widened even with the risk of the local sticking. However, in a capacitance type acoustic sensor, the vibrating electrode plate and the counter electrode plate face each other with the gap of several micrometers, the vibrating electrode plate comes into contact with the counter electrode plate by applying to the vibrating electrode plate only a small force exceeding the sound pressure. Because the vibrating electrode plate is soft and has such the weak spring property that the vibrating electrode plate is deformed by the sound pressure, the vibrating electrode plate has a weak restoring force when sticking to the counter electrode plate. Therefore, when the interval between the projections is widened, the local sticking is easy to be caused.

As a result, in the conventional acoustic sensor, the sticking is easily generated when the interval between the projections is excessively large or small, and it is thus difficult to provide the projections at proper intervals. Even in a case where the projections are provided at proper intervals in consideration of the values of the spring property of the vibrating electrode plate, the leading-end area of the projection, the liquid capillary force, the intersurface force, and the like, one of the whole sticking and the local sticking is possibly generated when the values of the spring property of the vibrating electrode plate and the like are varied.

When the projections are provided on the vibrating electrode plate, the vibrating electrode plate has enhanced rigidity and vibrates hardly by the sound pressure. Therefore, the projections are often provided on the counter electrode plate. In the case where the projections are provided on the vibrating electrode plate, the whole sticking indicates the state in which many of the projections on the vibrating electrode plate stick to the substantially whole of the counter electrode plate, and the local sticking indicates the state in which the projections on the vibrating electrode plate abut on the counter electrode plate and the vibrating electrode plate stick to the counter electrode plate while the portion between the projections on the vibrating electrode plate being deformed.

When the projections are provided at equal intervals on the substantially whole of the vibrating electrode plate or the counter electrode plate, the number of projections is increased because the many projections are provided even in a region where high projection density is not required. When the number of projections is increased, air between the vibrating electrode plate and the counter electrode plate is hardly discharged in bringing the vibrating electrode plate close to the counter electrode plate, and air hardly flows in between the vibrating electrode plate and the counter electrode plate in moving the vibrating electrode plate away from the counter electrode plate. As a result, an air resistance is increased when the vibrating electrode plate vibrates, and air damping suppresses the vibration of the vibrating electrode plate to degrade a frequency characteristic (particularly, characteristic in a high frequency) of the acoustic sensor.

In view of the foregoing technical problem, an object of the present invention is to provide an acoustic sensor that effectively reduces the phenomenon in which the vibrating electrode plate is firmly fixed to the counter electrode plate to disturb the vibration of the vibrating electrode plate.

Means for Solving the Problem

An acoustic sensor according to the present invention includes: a substrate; a vibrating electrode plate that is fixed to the substrate to sense a sound pressure; and a counter electrode plate that is fixed to the substrate to face the vibrating electrode plate with an air gap interposed therebetween, wherein a plurality of projections are provided on a surface on the air gap side of one of the vibrating electrode plate and the counter electrode plate, and an interval between the adjacent projections is changed according to a projection forming region in one of the vibrating electrode plate and the counter electrode plate.

In the acoustic sensor of the invention, the plural projections are provided on the surface on the air gap side of one of the vibrating electrode plate and the counter electrode plate. Thus, when the vibrating electrode plate deforms to come into contact with the counter electrode plate, the vibrating electrode plate and the counter electrode plate come into contact with each other with the projections interposed therebetween. As a result, a substantial contact area between the vibrating electrode plate and the counter electrode plate can be reduced to decrease the sticking of the vibrating electrode plate.

Further, in the acoustic sensor of the invention, because the interval between the adjacent projections is varied according to the projection forming region, it is possible to reduce the local sticking in which the vibrating electrode plate is firmly fixed to the counter electrode plate between the adjacent projections and the whole sticking in which one of the vibrating electrode plate and the counter electrode plate is firmly fixed to many of the projections in a wide region.

In the method for keeping the interval between the adjacent projections constant on the whole of the vibrating electrode plate or the counter electrode plate as well as adjusting the interval between the adjacent projections to a proper value, the local sticking or the whole sticking is possibly generated when the spring property of the vibrating electrode plate varies or when the capillary force of the water invading between the vibrating electrode plate and the counter electrode plate fluctuates. On the other hand, in the acoustic sensor of the invention, because the sticking of the vibrating electrode plate is reduced by changing the interval between the adjacent projections according to the projection forming region, the local sticking or the whole sticking is hardly generated even if the spring property of the vibrating electrode plate varies or even if the capillary force of the water invading between the vibrating electrode plate and the counter electrode plate fluctuates. Accordingly, an allowable range of a design value is widened for the interval between the adjacent projections, the characteristic of the acoustic sensor is stabilized, and the acoustic sensor is easily designed and produced.

Particularly, in the acoustic sensor according to an aspect of the present invention, in one of the vibrating electrode plate and the counter electrode plate on which the projections are provided, the interval between the adjacent projections in a high-flexibility region of the vibrating electrode plate or a counter region of the counter electrode plate facing the high-flexibility region is smaller than the interval between the adjacent projections in a low-flexibility region of the vibrating electrode plate or a counter region of the counter electrode plate facing the low-flexibility region.

In this aspect, because the local sticking is easily generated in the region where the vibrating electrode plate has the high flexibility, the local sticking can be reduced by relatively decreasing the interval between the adjacent projections in this region. Additionally, by increasing the interval between the adjacent projections in the region where the vibrating electrode plate has the low flexibility, the whole sticking can be reduced while the local sticking being suppressed. In this aspect, the interval between the adjacent projections is decreased only in the region where the vibrating electrode plate has the high flexibility, so that the number of projections can be decreased in total. When the number of projections is decreased, the air flow between the vibrating electrode plate and the counter electrode plate is hardly interrupted, so that the air damping is reduced, the frequency characteristic (particularly, the characteristic in the high frequency) of the acoustic sensor is flattened, and a frequency band is widened.

In the acoustic sensor according to a first different aspect of the present invention, the vibrating electrode plate is fixed to the substrate along an outer circumferential edge of a movable portion of the vibrating electrode plate, and the interval between the adjacent projections in a central portion of the movable portion or a region facing the central portion on the counter electrode plate is smaller than the interval between the adjacent projections in an outer circumferential portion of the movable portion or a region facing the outer circumferential portion on the counter electrode plate.

In the acoustic sensor (of the first different aspect of the invention) in which the vibrating electrode plate is fixed to the substrate along the outer circumferential edge of the movable portion, the local sticking is easily generated in the central portion of the vibrating electrode plate. Thus, the local sticking can be reduced by relatively decreasing the interval between the adjacent projections in the central portion of the vibrating electrode plate or in the region facing the central portion of the counter electrode plate. Further, by relatively increasing the interval between the adjacent projections in the outer circumferential portion of the movable portion or in the region facing the outer circumferential portion of the counter electrode plate, the whole sticking can be reduced while the local sticking being suppressed.

In another aspect of the first different aspect, the movable portion of the vibrating electrode plate is formed into a circular disc shape, and the interval between the adjacent projections in a region having a radius from R/8 to R/2 (R being a radius of the movable portion) around a center of the vibrating electrode plate or a region having a radius from R/8 to R/2 around a position facing the center on the counter electrode plate is smaller than the interval between the adjacent projections in a region located outside the region. In the region where the radius r from the center of the vibrating electrode plate is (½)R or more, the elastic deflection of the vibrating electrode plate is asymmetric. Therefore, the whole sticking is possibly generated when the interval between the projections is decreased even outside the defined region. Further, the elastic deflection of the vibrating electrode plate is maintained symmetric also outside the region where the radius r from the center is (⅛)R. Thus, unless the interval between the projections is decreased only inside the region of the radius r of (⅛)R from the center, the local sticking is possibly generated immediately outside the region.

In the acoustic sensor according to a second different aspect of the present invention, an outer circumferential portion of the movable portion of the vibrating electrode plate is partially fixed to the substrate at a plurality of points, and the interval between the adjacent projections in a region located between the fixed points on the vibrating electrode plate or a region located between points on the counter electrode plate facing the fixed points is smaller than the interval between the adjacent projections in the remaining projection forming region.

In the acoustic sensor (of the second different aspect) in which the outer circumferential portion of the movable portion of the vibrating electrode plate is partially fixed to the substrate at plural points, the local sticking is easily generated in the region located in the middle of the fixed sites on the vibrating electrode plate or the sites facing the fixed sites on the vibrating electrode plate. Therefore, the local sticking can be reduced by relatively decreasing the interval between the adjacent projections in this region. The whole sticking of the vibrating electrode plate can be reduced by increasing the interval between the adjacent projections in other projection forming regions where the local sticking is hardly generated.

In the acoustic sensor according to another different aspect of the present invention, the projections are arranged along a plurality of concentric circles or a plurality of polygons. Because the deflections of the vibrating electrode plate are often distributed in the concentric circular shapes or the concentric polygonal shapes, the sticking of the vibrating electrode plate can evenly and efficiently be avoided by arranging the projections along the concentric circles or polygons.

In the acoustic sensor according to still another different aspect of the present invention, the counter electrode plate includes a plurality of acoustic perforations in order to pass the sound pressure, and each of the projections is disposed in a central portion of a region surrounded by the acoustic perforations. This aspect facilitates production of the acoustic perforations and the projections because the acoustic perforations and the projections can be provided distant from each other as much as possible.

In the acoustic sensor according to still another different aspect of the present invention, the counter electrode plate includes a plurality of acoustic perforations in order to pass the sound pressure, and each of the projections is disposed out of a center in a region surrounded by the acoustic perforations. In this aspect, because the projection is provided close to the acoustic perforation, the water invading between the vibrating electrode plate and the counter electrode plate hardly remains in the position of the projection. Therefore, the vibrating electrode plate is unlikely to stick to the counter electrode plate due to the capillary force of the water so as to reduce the sticking of the vibrating electrode plate.

In the acoustic sensor according to still another different aspect of the present invention, the counter electrode plate includes a plurality of acoustic perforations in order to pass the sound pressure, and each of the projections is disposed in a position in contact with the acoustic perforation. In this aspect, because the projection is provided close to the position of the acoustic perforation, the water invading between the vibrating electrode plate and the counter electrode plate hardly remains in the position of the projection. Therefore, the vibrating electrode plate is unlikely to stick to the counter electrode plate due to the capillary force of the water so as to reduce the sticking of the vibrating electrode plate. When the acoustic perforations are formed after the projections are provided, part of the projections are ground in forming the acoustic perforations, the sectional area of the projection can be reduced to be smaller than the processing limit, and the sticking can be reduced more effectively.

In the present invention, the means for solving the problem has the feature that the constituents described above are appropriately combined, and various variations can be made in the present invention by the combination of the constituents.

Figure 1:
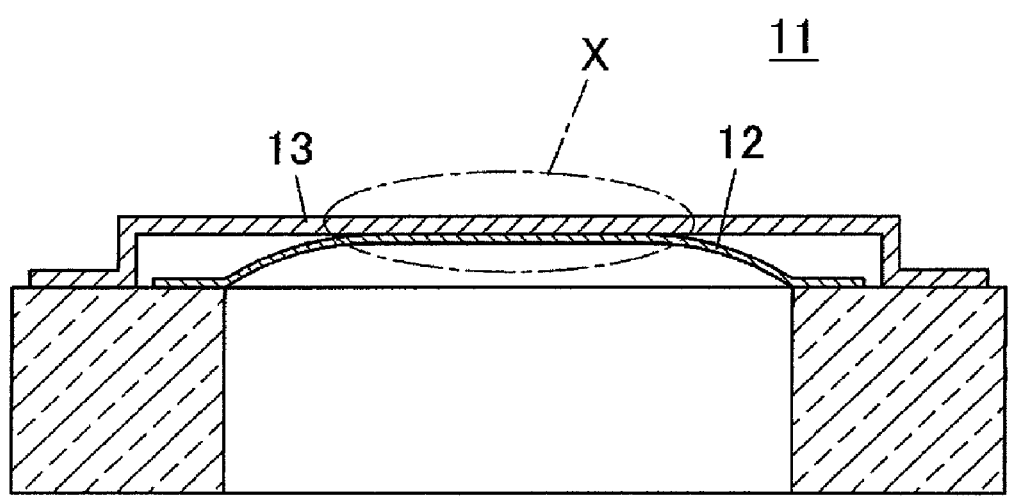
FIG. 1 is a schematic sectional view illustrating a state in which a vibrating electrode plate sticks to a counter electrode plate in a conventional acoustic sensor.
Figure 2:
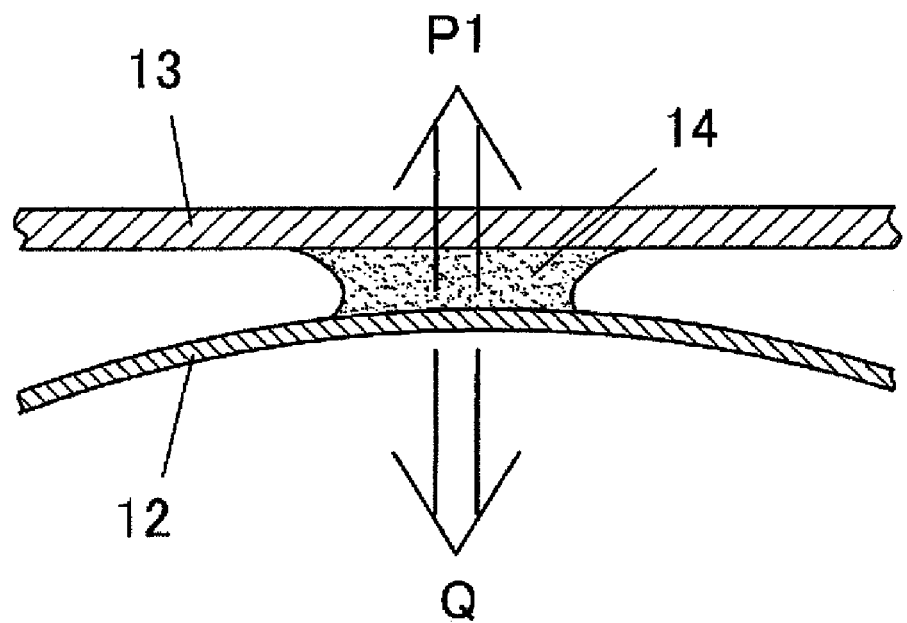
FIGS. 2(a) and 2(b) are views each illustrating a cause of generation of the sticking in the conventional acoustic sensor.
Figure 2:
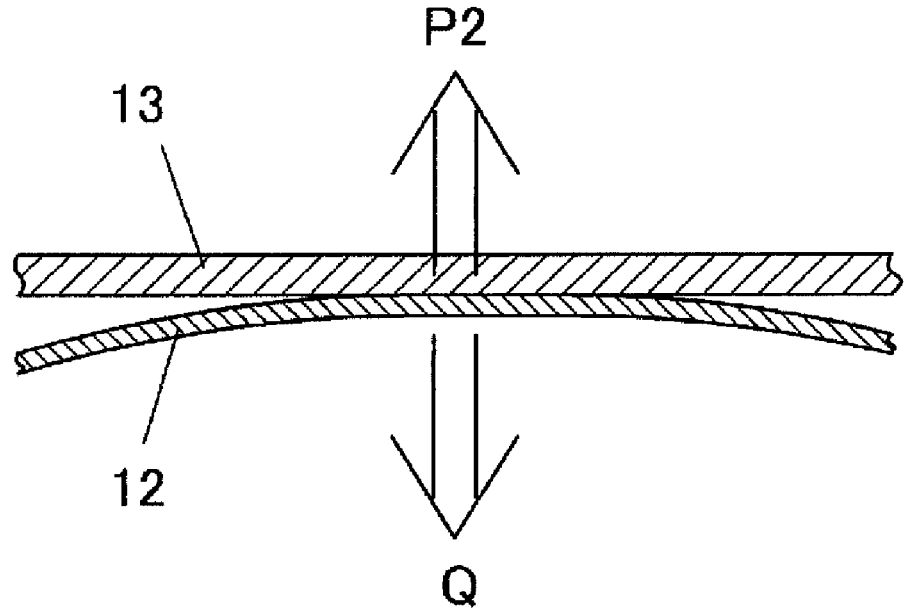
Figure 3:
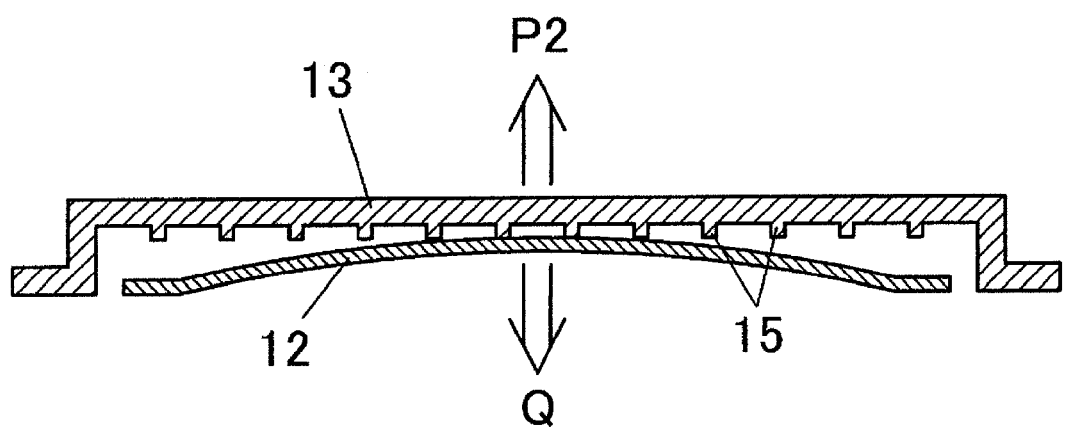
FIG. 3 is a schematic sectional view illustrating a vibrating electrode plate and a counter electrode plate provided with sticking preventing projections.
Figure 4:
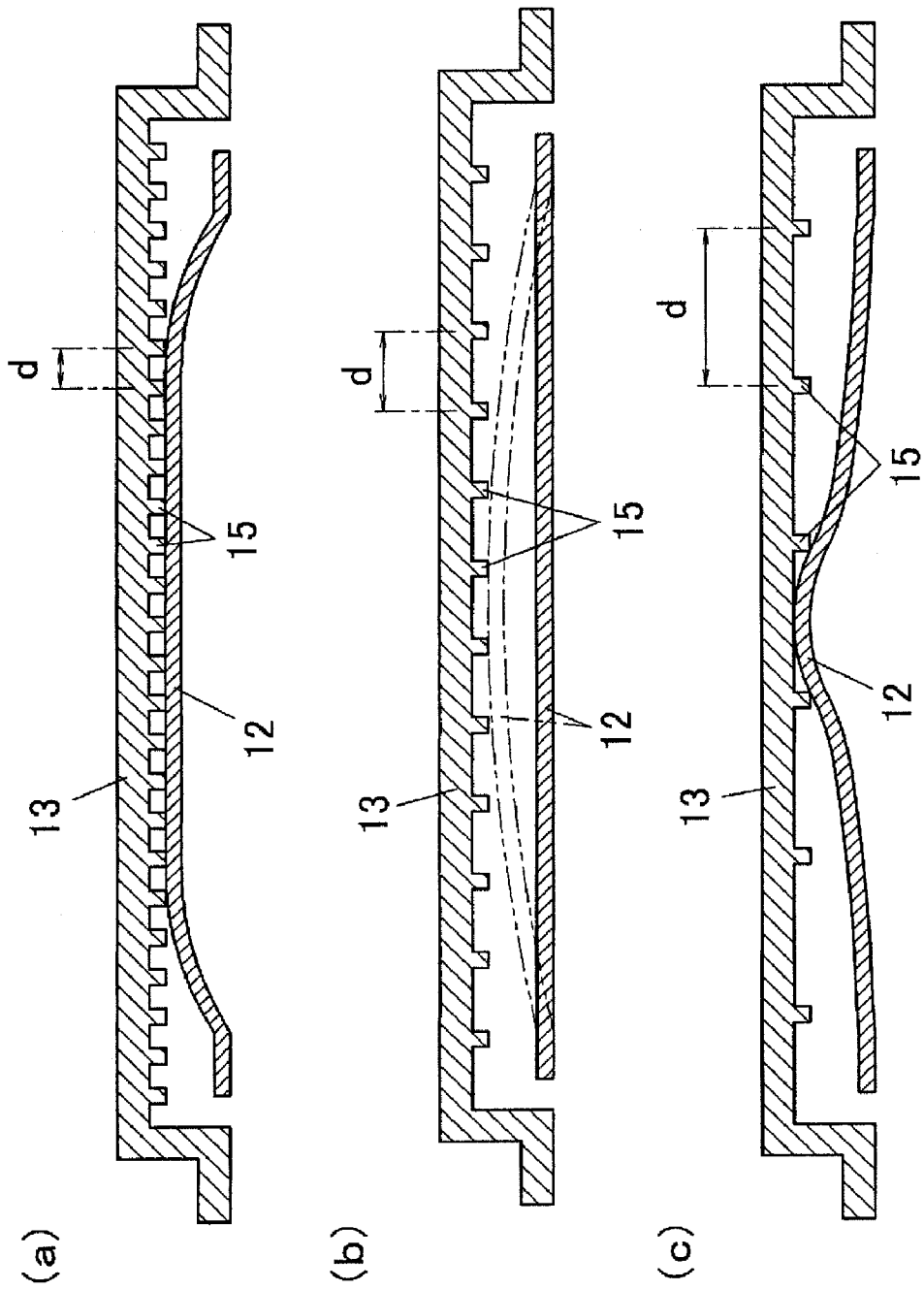
FIG. 4(a) is a view illustrating a case in which an interval between the projections is excessively small.
FIG. 4(b) is a view illustrating a case in which the interval between the projections is proper.
FIG. 4(c) is a view illustrating a case in which the interval between the projections is excessively large.

DESCRIPTION OF SYMBOLS 21 acoustic sensor
22 silicon substrate
23 insulating coating
24 vibrating electrode plate
25 counter electrode plate
26 through-hole
27 fixing portion
28 diaphragm
31 acoustic perforation
36 projection
37 water

BEST MODES FOR CARRYING OUT THE INVENTION

Preferred embodiments of the invention will be described below with reference to the accompanying drawings. However, the invention is not limited to the following embodiments, but various modifications can be made without departing from the scope of the invention. Particularly, the following numerical values indicate rough values such as a size of each member, and the acoustic sensor of the invention is not limited to these numerical values.

First Embodiment

Figure 5:
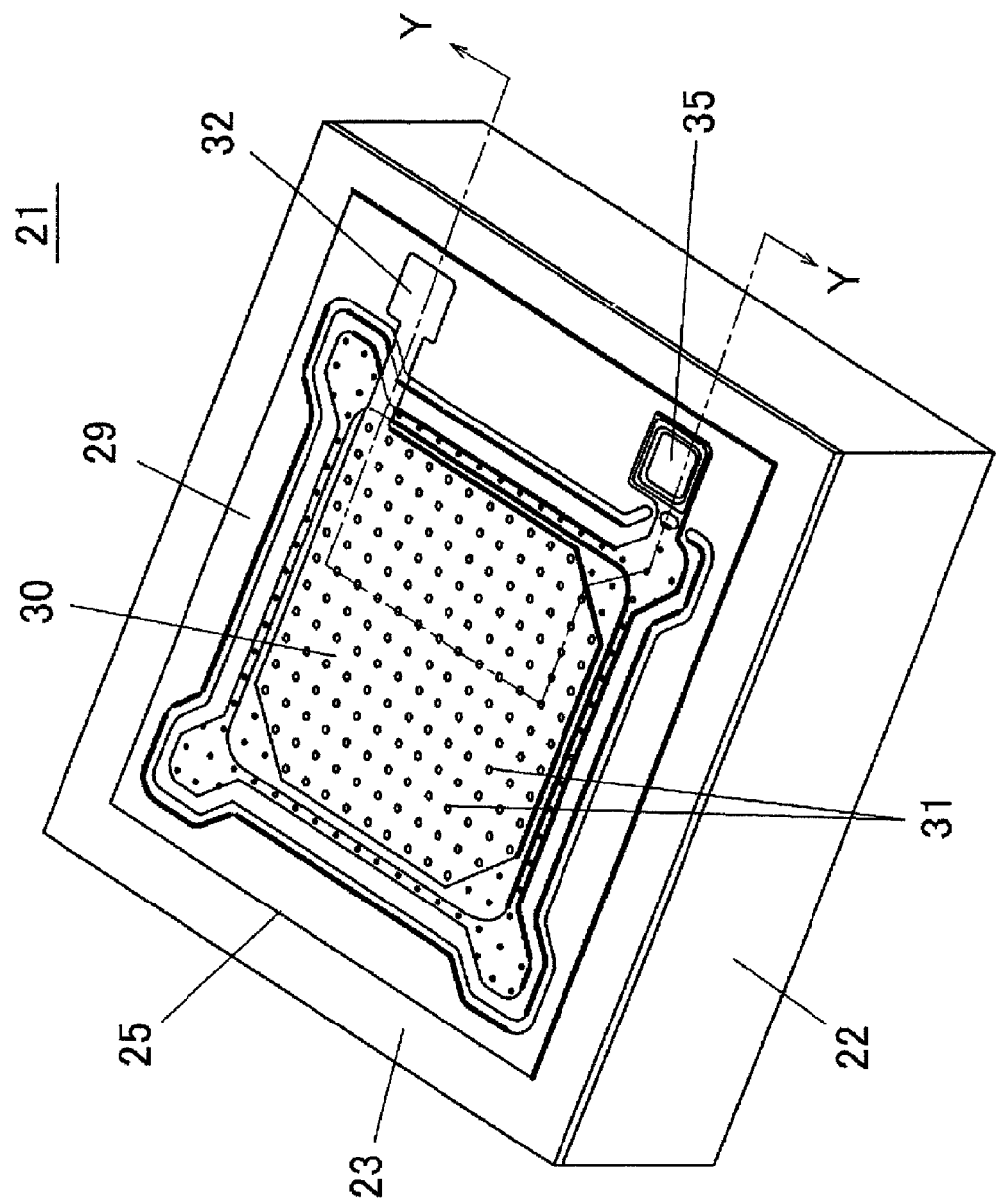
FIG. 5 is a perspective view illustrating an acoustic sensor according to a first embodiment of the present invention.
Figure 6:
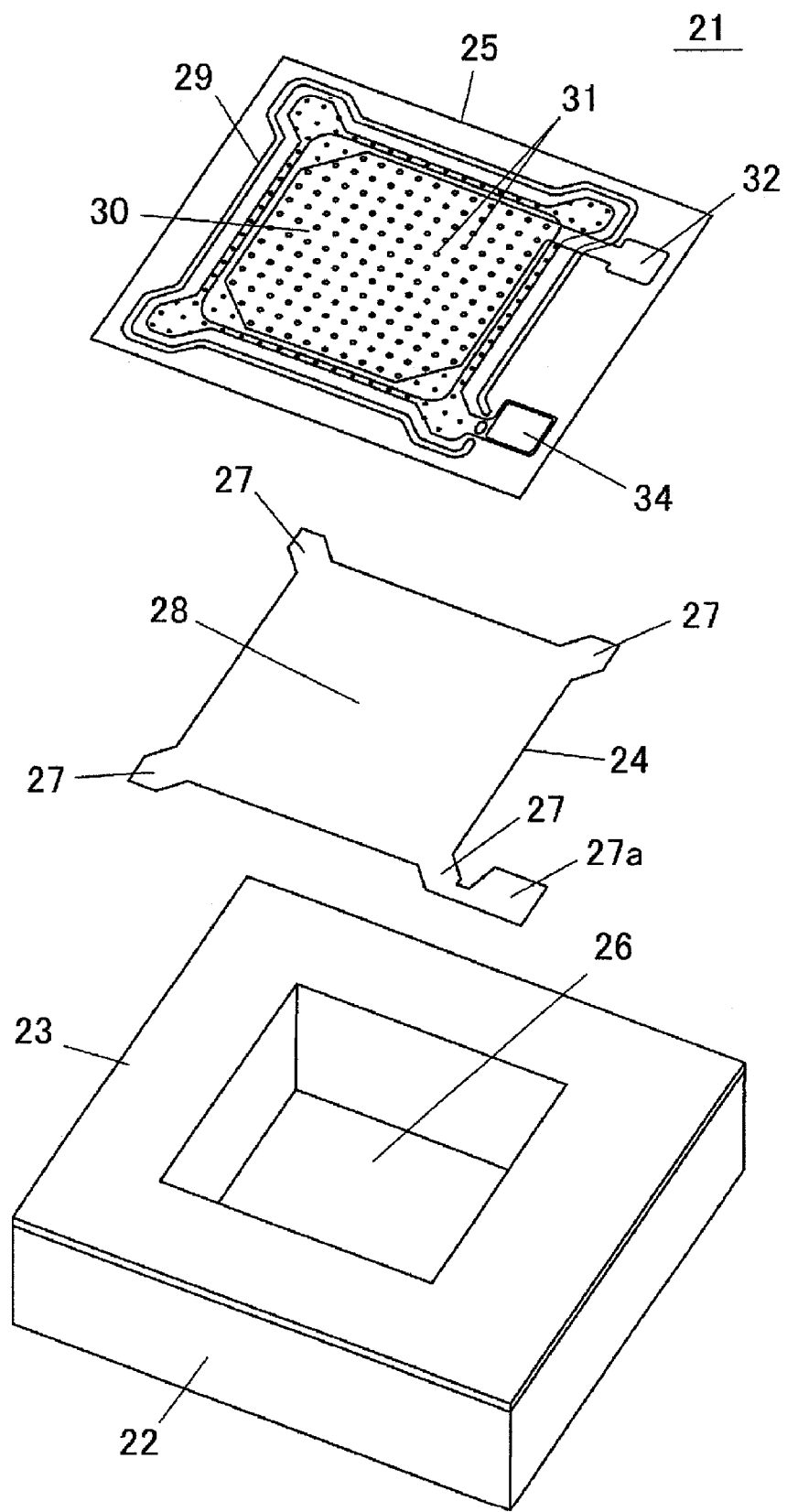
FIG. 6 is an exploded perspective view of the acoustic sensor according to the first embodiment.
Figure 7:
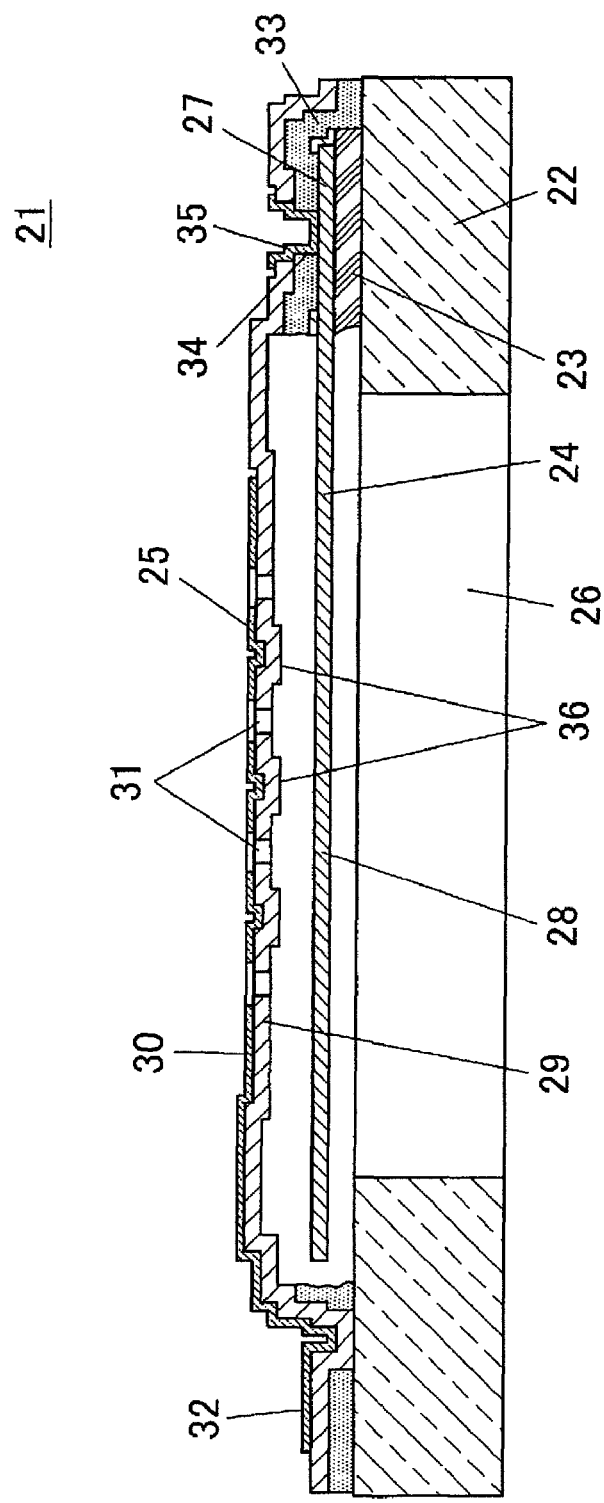
FIG. 7 is a sectional view taken on a line Y-Y of FIG. 5.

A first embodiment of the invention will be described with reference to FIGS. 5 to 13. FIG. 5 is a perspective view illustrating an acoustic sensor 21 according to the first embodiment of the invention, FIG. 6 is an exploded perspective view thereof, and FIG. 7 is a sectional view taken on a line Y-Y of FIG. 5.

The acoustic sensor 21 is of a capacitance type. In the acoustic sensor 21, a vibrating electrode plate 24 is provided on an upper surface of a silicon substrate 22 with an insulating coating 23 interposed therebetween, and a counter electrode plate 25 is provided on the vibrating electrode plate 24 with a micro gap (air gap) interposed therebetween.

A prismatic through-hole 26 or a truncated-pyramid recess is provided in the silicon substrate 22. The prismatic through-hole 26 is illustrated in the drawing. The silicon substrate 22 has a size of 1 to 1.5 mm square (can be formed smaller than this size) in a planar view, and the silicon substrate 22 has a thickness of about 400 to about 500 μm. The insulating coating 23 made of an oxide film or the like is formed on the upper surface of the silicon substrate 22.

The vibrating electrode plate 24 is made of a polysilicon thin film having a thickness of about 1 μm. The vibrating electrode plate 24 is a thin film formed into a substantially rectangular shape, and fixing portions 27 are extended outward in diagonal directions in four corner portions. The vibrating electrode plate 24 is disposed on the upper surface of the silicon substrate 22 such that the through-hole 26 or the upper opening of the recess is covered therewith, and the fixing portions 27 are fixed onto the insulating coating 23. The portion (in the this embodiment, portion except for the fixing portion 27) that is supported while floating above the through-hole 26 or the recess in the vibrating electrode plate 24 constitutes a diaphragm 28 (movable portion), which vibrates in response to a sound pressure.

In the counter electrode plate 25, a fixed electrode 30 made of a metallic thin film is provided on an upper surface of an insulating support layer 29 made of a nitride film. The counter electrode plate 25 is disposed on the vibrating electrode plate 24. Outside a region facing the diaphragm 28, the counter electrode plate 25 is fixed to the upper surface of the silicon substrate 22 while an insulating coating 33 made of an oxide film is interposed therebetween. In the region facing the diaphragm 28, the diaphragm 28 is covered with the counter electrode plate 25 with a micro gap of about 3 μm. In order to pass the sound pressure (vibration), plural acoustic perforations (acoustic holes) 31 are provided in the fixed electrode 30 and the support layer 29 so as to pierce from the upper surface to the lower surface. An electrode pad 32 electrically connected to the fixed electrode 30 is provided in an end portion of the counter electrode plate 25. The vibrating electrode plate 24 is made of a thin film having a thickness of about 1 μm because the vibrating electrode plate 24 vibrates by resonating with the sound pressure. However, because the counter electrode plate 25 is not excited by the sound pressure, the counter electrode plate 25 has a large thickness of 2 μm or more.

In a region facing the vibrating electrode plate 24 of the counter electrode plate 25, plural projections 36 are provided in order to prevent the vibrating electrode plate 24 from firmly sticking to the counter electrode plate 25. The projection 36 is desirably thinned as much as possible such that a leading-end area is reduced, and the projection 36 preferably has a diameter of 10 μm or less. However, in view of production, there is a limitation to thin the projection 36. Therefore, the projection 36 desirably has the projection length of about 1 μm and a diameter of about 4 μm.

An extended portion 27a extended from the fixing portion 27 is exposed from an opening 34 formed in the support layer 29, and an electrode pad 35 provided on the upper surface of the end portion of the support layer 29 is electrically connected to the extending portion 27a through the opening 34. Therefore, the vibrating electrode plate 24 and the counter electrode plate 25 are electrically insulated, and the vibrating electrode plate 24 and the fixed electrode 30 constitute a capacitor.

In the acoustic sensor 21 of the first embodiment, when acoustic vibration (a compressional wave of air) is incident from the upper surface, the acoustic vibration reaches the diaphragm 28 through the acoustic perforations 31 in the counter electrode plate 25, whereby the diaphragm 28 vibrates. When the diaphragm 28 vibrates, a distance between the diaphragm 28 and the counter electrode plate 25 is changed to vary an electrostatic capacitance between the diaphragm 28 and the fixed electrode 30. Therefore, when a direct-current voltage is applied between the electrode pads 32 and 35 and the variation in electrostatic capacitance is taken out as an electric signal, the acoustic vibration can be detected by converting the acoustic vibration into the electric signal.

The acoustic sensor 21 is produced by using the micromachining (semiconductor microfabrication) technique. Because the production method is a well known technique, description thereof is not provided.

Figure 8:
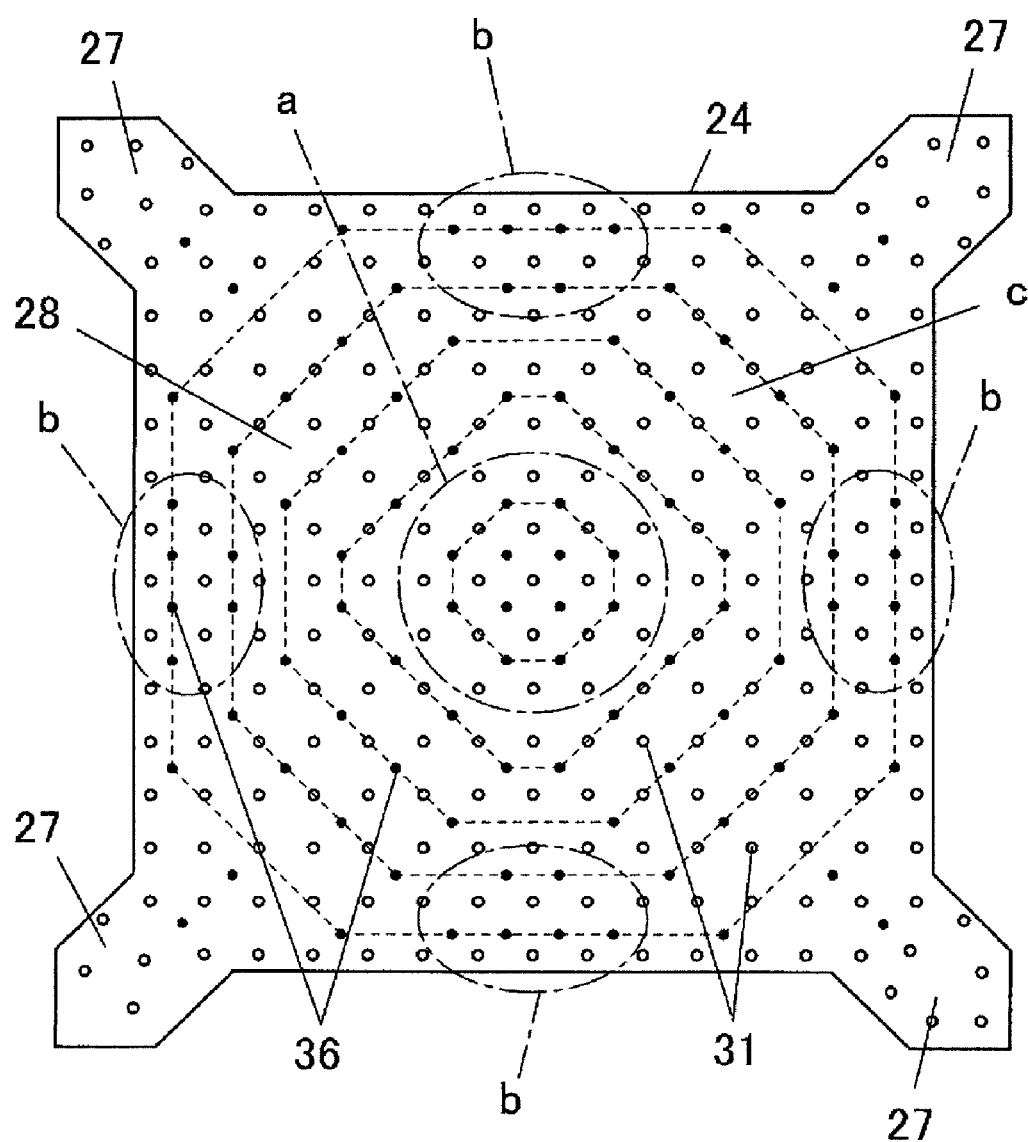
FIG. 8 is a view illustrating a positional relationship among a vibrating electrode plate, acoustic perforations, and projections when viewed from a direction perpendicular to the vibrating electrode plate.

The arrangement of the projections 36 provided on the counter electrode plate 25 is described below. FIG. 8 is a view illustrating a positional relationship among the vibrating electrode plate 24, the acoustic perforations 31, and the projections 36 when viewed from a direction perpendicular to the vibrating electrode plate 24. The acoustic perforation 31 is indicated by a white circle, and the projection 36 is indicated by a black circle. The acoustic perforations 31 are entirely arranged at equal intervals in a lattice shape.

On the other hand, the projections 36 are arranged along similar polygonal shapes (in FIG. 8, octagons indicated by broken lines) that are concentrically disposed from the central portion sequentially to the outside, and each of the projections 36 is disposed in the center of a region surrounded by the four acoustic perforations 31.

The interval between the projections 36 is relatively shortened in regions facing a central portion a surrounded by an alternate long and short dash line of the diaphragm 28 and a central portion b of each side, and the interval between the projections 36 is relatively lengthened in the remaining region. In the example shown in FIG. 8, a length L of one side of the diaphragm 28 is 800 µm, and the interval between the projections 36 is 50 µm in the regions facing the central portion a and the central portion b of each side of the diaphragm 28, while the interval between the projections 36 is 100 µm in the remaining regions.

Figure 9:
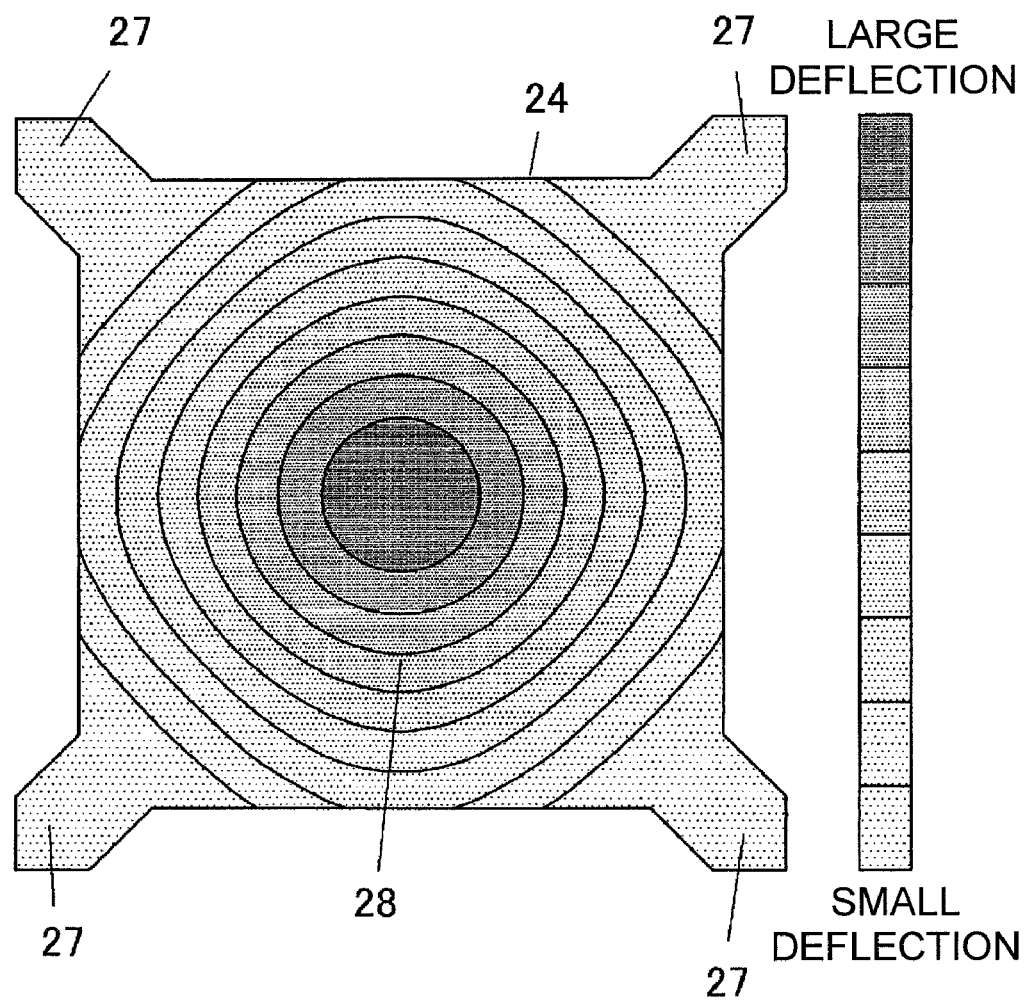
FIG. 9 is a view illustrating a distribution of a degree of flexibility of the vibrating electrode plate of which fixing portions at four corners are fixed to a silicon substrate.

FIG. 9 is a view illustrating a magnitude of deflection in a segmental manner in a case where an even pressure is applied to the whole of the diaphragm 28 in the rectangular vibrating electrode plate 24 with the four fixing portions 27 being fixed to the silicon substrate 22. Indicated therein is that the deflection is increased with an increasing hatching dot density and the deflection is decreased with decreasing the hatching dot density. As can be seen from FIG. 9, the flexibility is reduced to decrease the deflection toward the outside from the center of the vibrating electrode plate 24, and the deflection is increased compared with the surroundings in the central portion a and the central portion b of each side.

Figure 10:
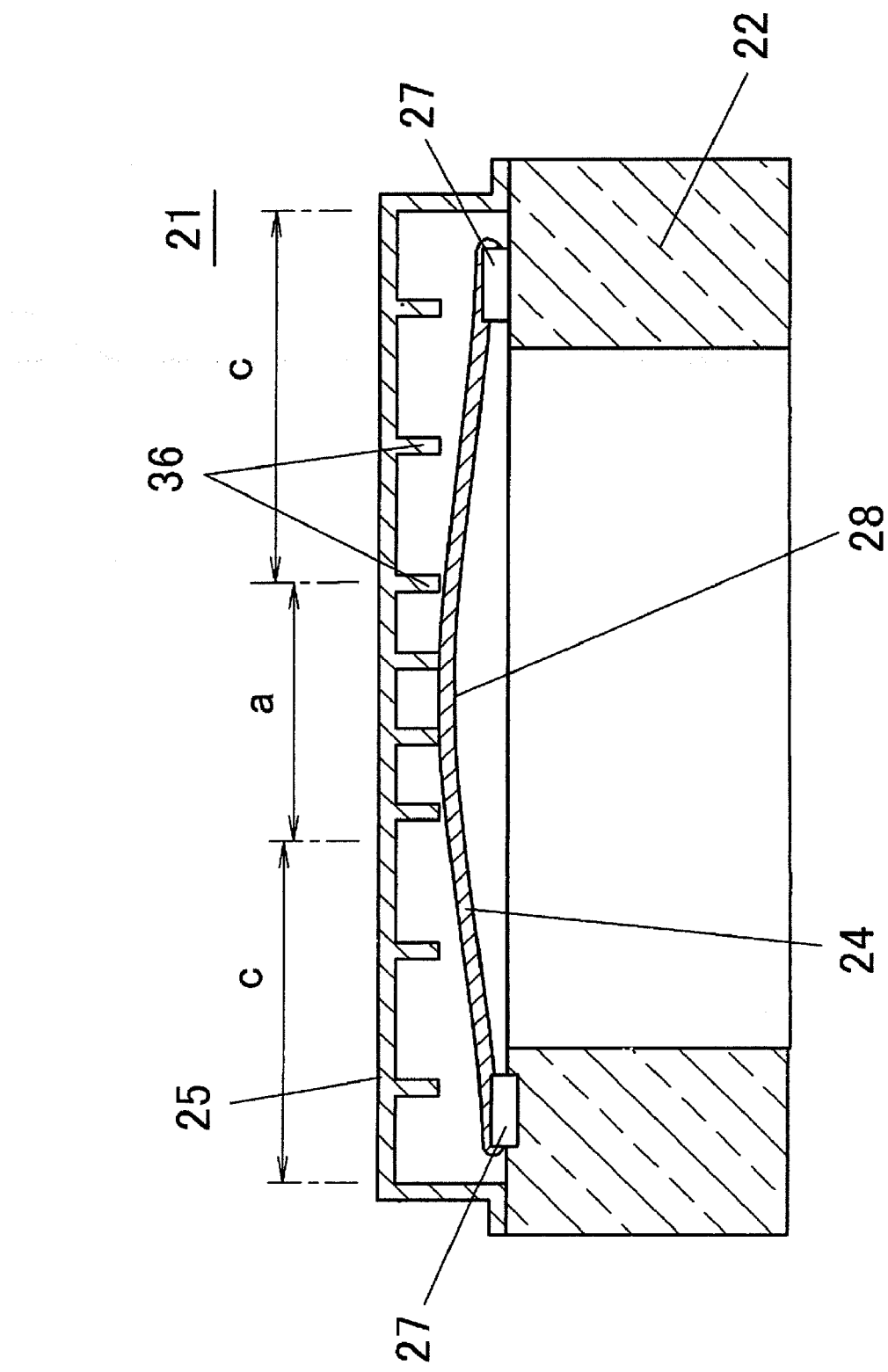
FIG. 10 is an explanatory view illustrating action of the acoustic sensor according to the first embodiment, showing a perpendicular section in a diagonal direction of the vibrating electrode plate.

In the acoustic sensor 21, as schematically illustrated in FIG. 10, the interval between the projections 36 is smaller in the regions facing the central portion a and the central portion b of each side, where the vibrating electrode plate 24 is soft and has large deflection, while the interval between the projections 36 is larger in the region facing a region c, where the vibrating electrode plate 24 has relatively high rigidity and small deflection. As a result, it is possible to reduce the local sticking and the whole sticking which are described in the conventional art. The reason therefor will be described below.

As described in the conventional example, the local sticking, in which the vibrating electrode plate drops between the projections and comes into contact with the counter electrode plate, is easily generated in the soft portion (central portion) of the vibrating electrode plate. On the other hand, in the acoustic sensor 21, the interval between the projections 36 is decreased in the regions facing the central portion a and the central portion b of each side of the diaphragm 28, the local sticking is hardly generated. In a case where the interval between the projections is equalized overall, if the interval between the projections is small, the vibrating electrode plate sticks to almost all the projections to easily generate the whole sticking. On the other hand, in the acoustic sensor 21, the interval between the projections 36 is increased except in the region where the local sticking is easily generated, so that the number of projections 36 (that is, to total area of end faces of the projections 36) can be decreased to reduce the whole sticking. Therefore, the local sticking and the whole sticking can effectively be reduced.

Figure 11:
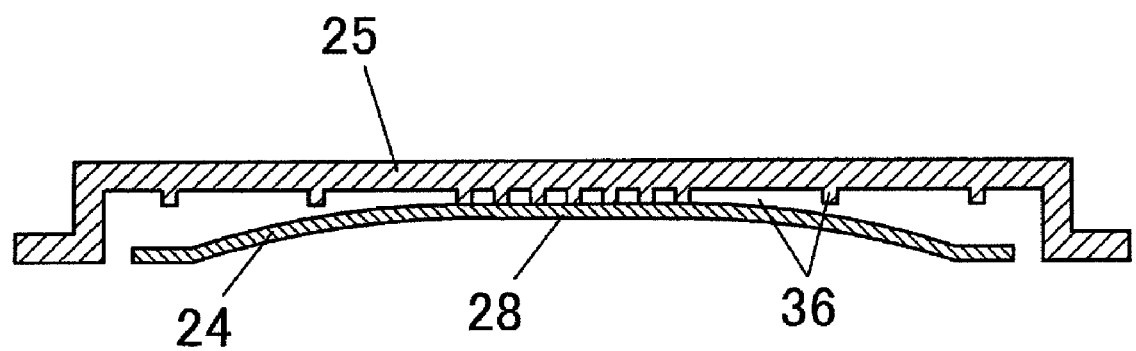
FIG. 11 is a view illustrating a vibrating electrode plate and a counter electrode plate for the purpose of comparison, showing a perpendicular section in a diagonal direction of the vibrating electrode plate.
Figure 12:
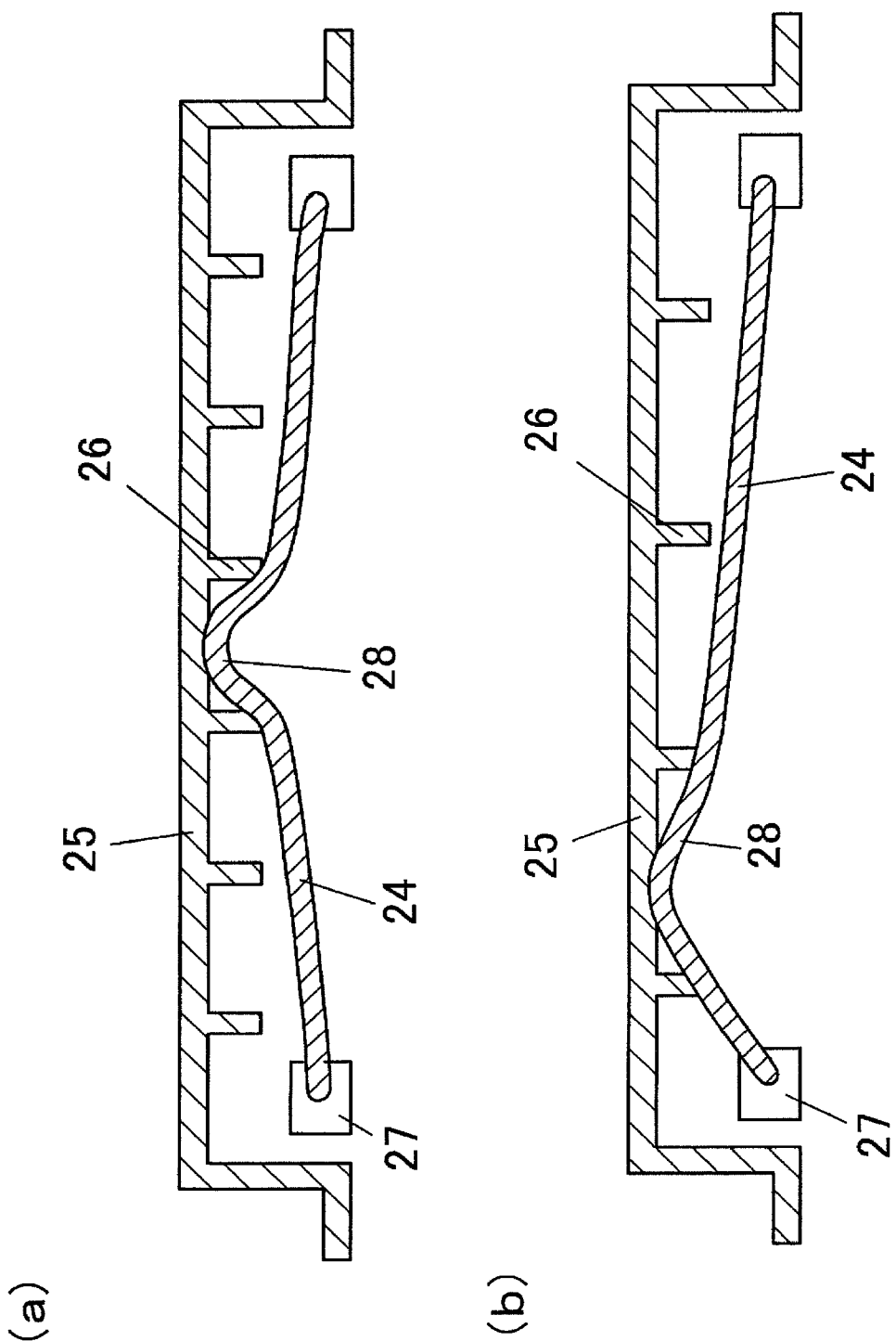
FIG. 12(a) is a schematic sectional view illustrating a state in which local sticking is generated in a central portion of the vibrating electrode plate.
FIG. 12(b) is a schematic sectional view illustrating a state in which the local sticking is generated at an end of the vibrating electrode plate.

More particularly, the interval between the projections 36 in the regions facing the central portion a and the central portion b of each side on the vibrating electrode plate 24 is smaller than a limit value D3 at which the local sticking is generated in the portion of the softest projections 36. When the interval between the projections 36 in the regions facing the central portions a and b is excessively small, as illustrated in FIG. 11, the vibrating electrode plate 24 sticks to the projections 36 in the whole of the central portions a and b. Therefore, it is necessary that the interval between the projections 36 in the regions facing the central portion a and the central portion b of each side on the vibrating electrode plate 24 be smaller than the limit value D3 at which the vibrating electrode plate 24 generates the local sticking in the central portions a or b and larger than a limit value D1 at which the vibrating electrode plate 24 sticks to the whole of the projections 36 in the regions facing the central portion a or b.

The interval between the projections 36 in the region facing the region c except for the central portions a and b on the vibrating electrode plate 24 is larger than a limit value D2 at which the whole sticking is generated on the vibrating electrode plate 24. However, when the interval between the projections 36 in the region facing the region c except for the central portions a and b is excessively large, as illustrated in FIG. 12(b), the vibrating electrode plate 24 drops between the projections 36 in the region c except for the central portions a and b to cause the local sticking. Therefore, it is necessary that the interval between the projections 36 in the region facing the region c except for the central portions a and b on the vibrating electrode plate 24 be larger than the limit value D2 at which the vibrating electrode plate 24 generates the whole sticking and smaller than the limit value D4 at which the vibrating electrode plate 24 generates the local sticking in the region facing the region c except for the central portions a and b on the vibrating electrode plate 24.

The limit value D3 at which the central portions a and b on the vibrating electrode plate 24 generate the local sticking as illustrated in FIG. 12(a) is compared to the limit value D4 at which the region except for the central portions a and b generates the local sticking as illustrated in FIG. 12(b). As illustrated in FIG. 9, because the central portions a and b are places in which the vibrating electrode plate 24 is soft and deforms easily, the local sticking in the region c of FIG. 12(b) is unlikely to be generated rather than the local sticking in the central portions a and b of FIG. 12(a). Therefore, the limit value D4 of the interval between the projections 36, at which the vibrating electrode plate 24 generates the local sticking in the region c except for the central portions a and b is generally larger than the limit value D3 of the interval between the projections 36, at which the vibrating electrode plate 24 generates the local sticking in the central portions a and b.

The limit value D1 of the interval between the projections 36, at which the vibrating electrode plate 24 sticks only to all the projections 36 in the regions facing the central portions a and b, is smaller than the limit value D2 of the interval between the projections 36, at which the whole sticking is generated in the whole of the projections 36.

Figure 13:
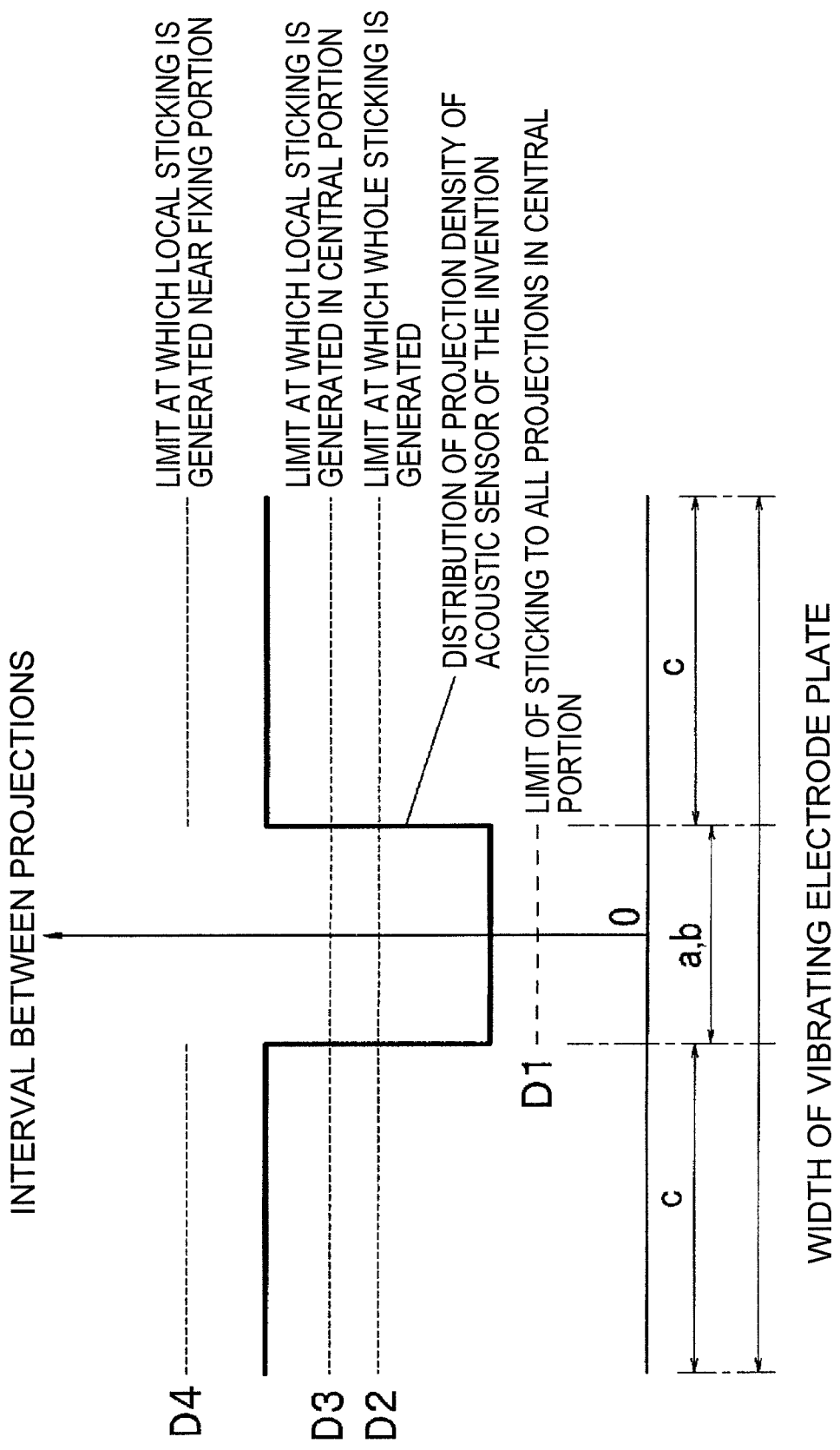
FIG. 13 is a view illustrating a method for determining an interval between projections in the central portion of the vibrating electrode plate in the acoustic sensor and a method for determining the interval between the projections in a region except for the central portion of the vibrating electrode plate.

Therefore, the four limit values have the relationship expressed by D1<D2<D3<D4, and the intervals between the projections 36 in the acoustic sensor 21 is distributed as illustrated in FIG. 13.

When the interval between the projections is equalized like the conventional acoustic sensor, it is necessary that the interval between the projections be properly adjusted so as to be larger than the limit value D2 and smaller than the limit value D3. Because of the narrow adjusting range, it is difficult to produce the acoustic sensor. On the other hand, in the acoustic sensor 21 of the first embodiment, the interval between the projections 36 may be larger than the limit value D1 and smaller than the limit value D3 in the regions facing the central portions a and b on the vibrating electrode plate 24. The interval between the projections 36 may be larger than the limit value D2 and smaller than the limit value D4 in the region facing the region c except for the central portions a and b. Therefore, an allowable range is widened in both the central portions a and b and the region c.

Accordingly, in the acoustic sensor 21 of the first embodiment, the sticking of the vibrating electrode plate 24 can easily be reduced, and the acoustic sensor 21 is also easy to produce. In the acoustic sensor 21, even if the spring property of the vibrating electrode plate 24 varies, even if the capillary force of the invading water fluctuates, or even if the intersurface force varies, the local sticking and the whole sticking can be suppressed to improve reliability of the acoustic sensor 21.

Because the deflection distribution of the vibrating electrode plate 24 is often in the concentric circular shapes or the concentric polygon shapes, when the projections 36 are arranged along the concentric polygons (see FIG. 8) as described above, the sticking of the vibrating electrode plate 24 can evenly and efficiently be avoided.

In the acoustic sensor 21, the number of projections 36 can be decreased compared with the projections of the equal interval. Therefore, the air flow in the micro gap between the vibrating electrode plate 24 and the counter electrode plate 25 is hardly interrupted by the projections 36, and the air damping of the vibrating electrode plate 24 is reduced. As a result, the frequency characteristic (particularly, the characteristic in the high-frequency) of the acoustic sensor 21 is flattened, and the frequency band is widened.

Second Embodiment

An acoustic sensor according to a second embodiment will be described with reference to FIGS. 14 to 17. Because a structure of the acoustic sensor according to the second embodiment is substantially similar to the structure of the acoustic sensor 21 according to the first embodiment, the entire structure and description thereof are not provided.

The acoustic sensor of the second embodiment differs mainly from the acoustic sensor of the first embodiment in the shape of the vibrating electrode plate 24 and the arrangement of the projections 36. These different points will be described below.

Figure 14:
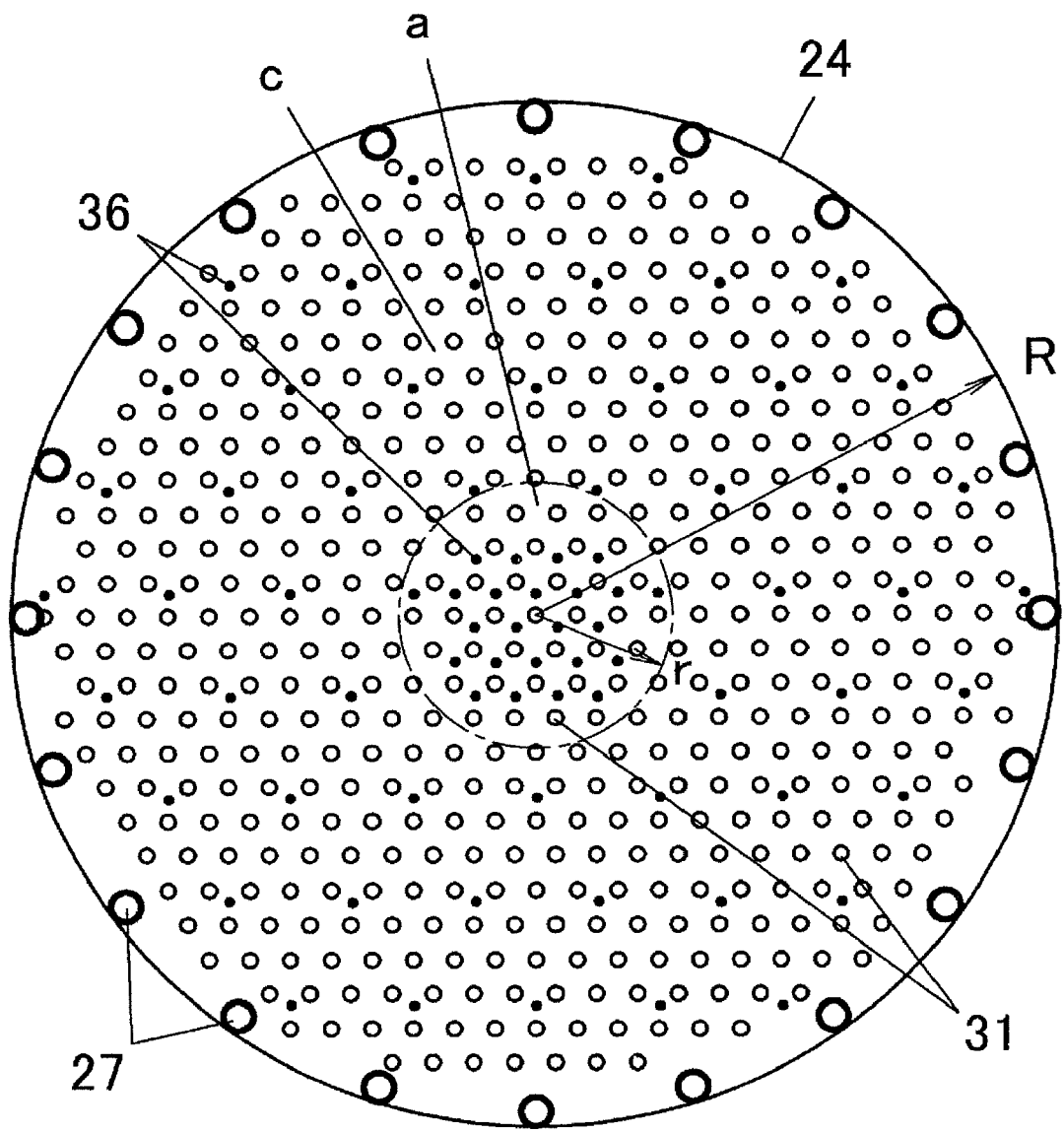
FIG. 14 is a view illustrating a shape of a vibrating electrode plate used in an acoustic sensor according to a second embodiment of the present invention and a positional relationship among the vibrating electrode plate, acoustic perforations, and projections when viewed from a direction perpendicular to the vibrating electrode plate.

FIG. 14 is a view illustrating a positional relationship among the vibrating electrode plate 24, the acoustic perforations 31, and the projections 36 in the second embodiment, when viewed from a direction perpendicular to the vibrating electrode plate 24. The vibrating electrode plate 24 has a circular disc shape, and a cylindrical through-hole or a truncated-cone recess is provided in the silicon substrate 22 corresponding to the shape of the vibrating electrode plate 24. The vibrating electrode plate 24 is disposed such that the upper opening of the through-hole or the recess in the silicon substrate 22 is covered therewith, and the substantially whole of the outer circumferential portion of the vibrating electrode plate 24 is fixed to the silicon substrate 22 by the fixing portions 27.

The acoustic perforations 31 are arranged in a rectangular or hexagonal shape at constant intervals in the counter electrode plate 25 facing the vibrating electrode plate 24. from the surface of the counter electrode plate 25 facing the vibrating electrode plate 24, the plural projections 36 project in the substantial center of the region surrounded by the acoustic perforations 31. The interval between the projections 36 is relatively small in a central portion a of the circle that is concentric with the outer circumferential edge of the vibrating electrode plate 24, while the interval between the projections 36 is relatively large in a region c located outside the central portion a.

Assuming that R is a radius of the vibrating electrode plate 24, a radius r of the circular region (central portion a), where the interval between the projections 36 is decreased, is in the following range:

$$(1/8)R \leq r \leq (1/2)R$$

Figure 15:
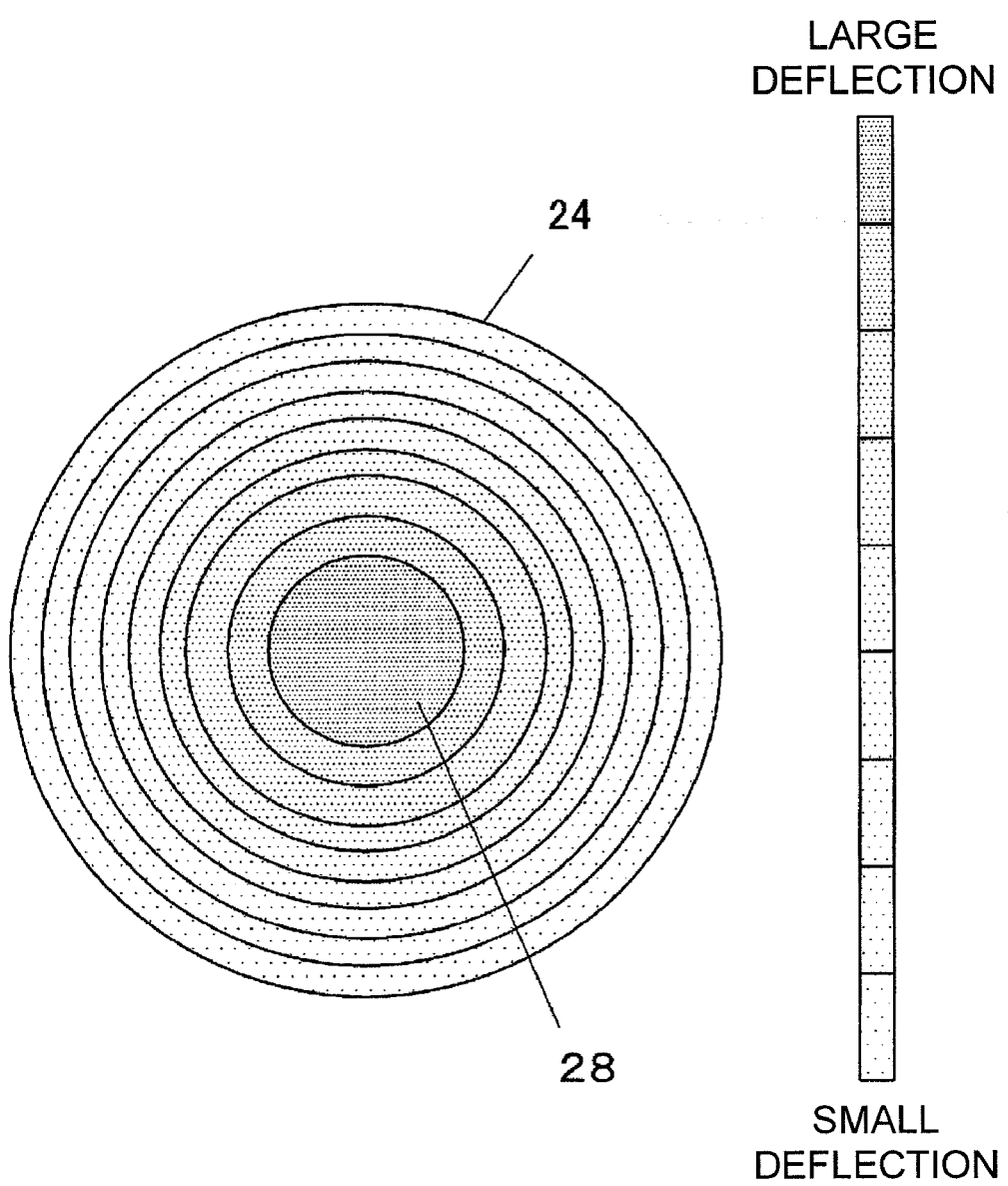
FIG. 15 is a view illustrating a distribution of flexibility of a circular disc vibrating electrode plate of which outer circumferential portion is fixed to a silicon substrate.

FIG. 15 is a view illustrating a magnitude of deflection in a segmental manner in a case where an even pressure is applied to the whole of the diaphragm 28 in the circular vibrating electrode plate 24. As can be seen from FIG. 15, the flexibility is reduced to decrease the deflection toward the outside from the center of the vibrating electrode plate 24, and the deflection is maximized in the central portion a thereof. In the region where the radius r from the center is (1/2)R or more, because the elastic deflection of the diaphragm 28 is asymmetric, the local sticking is hardly generated, and the whole sticking is possibly generated if the interval between the projections 36 is decreased even outside the region. Also outside the region where the radius r from the center is (1/8)R, the elastic deflection of the diaphragm 28 is maintained symmetric. Thus, unless the interval between the projections 36 is decreased only inside the region of the radius r of (1/8)R from the center, the local sticking is possibly generated immediately outside the region. Therefore, the interval between the projections 36 is desirably decreased in a circular region a having the radius r expressed by:

$$(1/8)R \leq r \leq (1/2)R$$

In the acoustic sensor of the second embodiment, for example, the thickness of the vibrating electrode plate 24 is set to 1 μm, the thickness of the counter electrode plate 25 is set to 2 μm, the micro gap between the vibrating electrode plate 24 and the counter electrode plate 25 is set to 3 μm, and the height of the projection 36 is set to 1 μm. The projection 36 preferably has the diameter of 10 μm or less and is thinned as much as possible. However, in view of production, there is a limitation to thin the projection 36. Therefore, the diameter of the projection 36 is desirably set to about 4 μm. When the radius R of the vibrating electrode plate 24 is set to 500 μm, the interval between the projections 36 is set to 50 μm inside the circular central portion a, and the interval between the projections 36 is set to 100 μm in the region c outside the central portion a.

In the second embodiment, a region corresponding to the central portion b of the first embodiment does not exist because the vibrating electrode plate 24 has the circular shape. However, the interval between the projections 36 is decreased in the central portion a and the interval between the projections 36 is increased in the region c located outside the central portion a, which achieves an effect similar to that of the first embodiment. Particularly, also in the second embodiment, the local sticking and the whole sticking can be reduced to improve the reliability of the acoustic sensor. Additionally, the interval between the projections 36 is decreased in the region where the vibrating electrode plate 24 has high flexibility and the interval between the projections 36 is increased in the region where the vibrating electrode plate 24 has low flexibility. Therefore, the proper range of the interval between the projections 36 can be widened in each region (see FIG. 13), and the acoustic sensor can easily be designed and produced. Even if the spring property of the vibrating electrode plate 24 varies or even if the capillary force of the invading liquid fluctuates, the local sticking or the whole sticking is hardly generated, and the reliability of the acoustic sensor can be further improved. Because the number of projections 36 is decreased, the air damping of the vibrating electrode plate 24 can be reduced, the frequency characteristic (particularly, the characteristic in the high-frequency) of the acoustic sensor 21 is flattened, and the frequency band can be widened.

Figure 16:
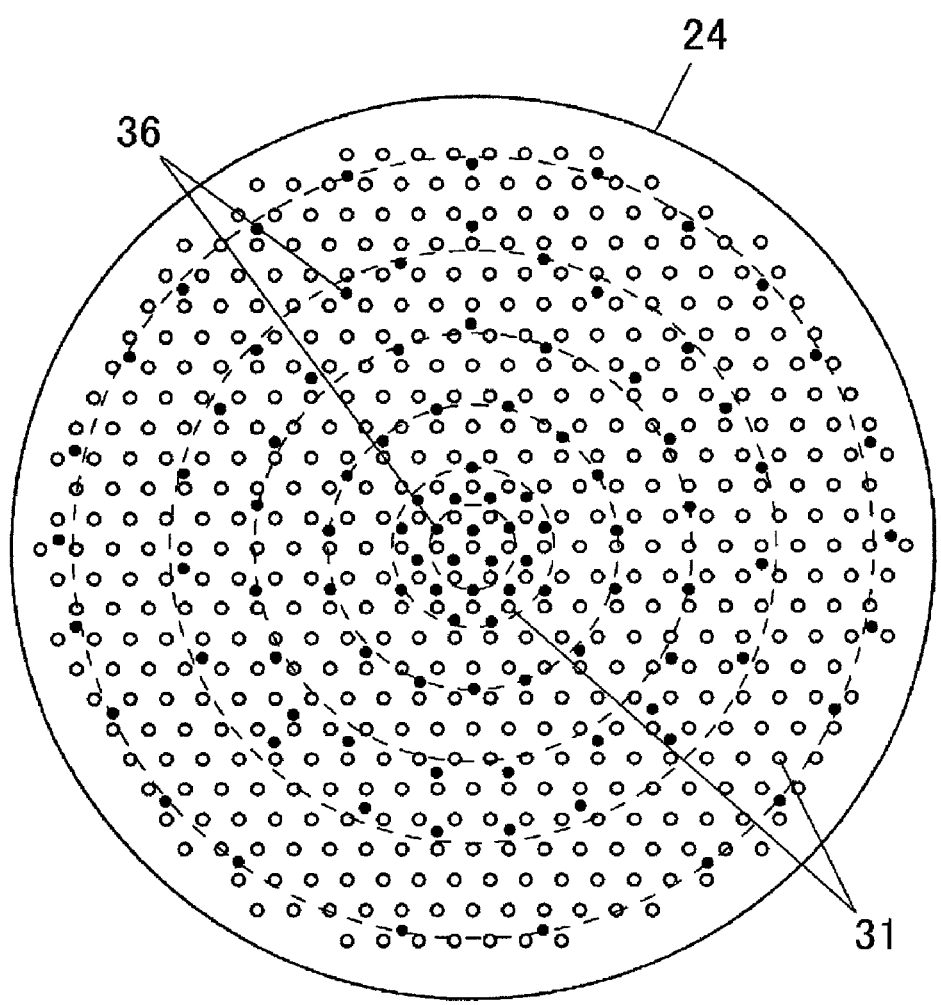
FIG. 16 is a view illustrating another positional relationship among the vibrating electrode plate, the acoustic perforations, and the projections in the second embodiment.
Figure 17:
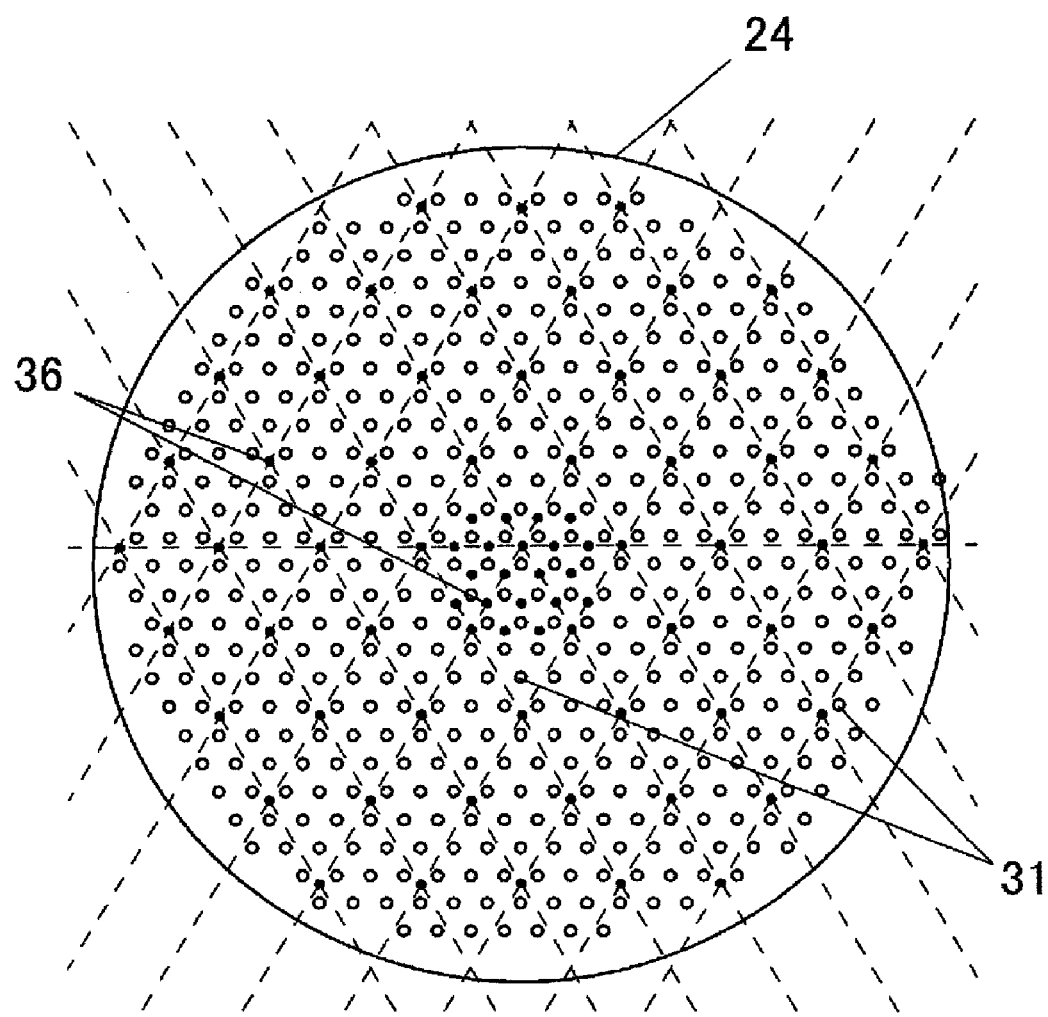
FIG. 17 is a view illustrating still another positional relationship among the vibrating electrode plate, the acoustic perforations, and the projections in the second embodiment.

As the method for the arranging the projections 36, as illustrated in FIG. 16, the projections 36 may be arranged along circles concentric with the vibrating electrode plate 24. Alternatively, as illustrated in FIG. 17, the projections 36 may be arranged at apexes of equilateral triangles arranged with no gap therebetween. Because the deflection distribution of the vibrating electrode plate 24 is often in the concentric circular shapes or the concentric polygon shapes, when the projections 36 are arranged in the concentric circular shapes or the equilateral triangular shapes, the sticking of the vibrating electrode plate 24 can evenly and efficiently be avoided.

Third Embodiment

Figure 18:
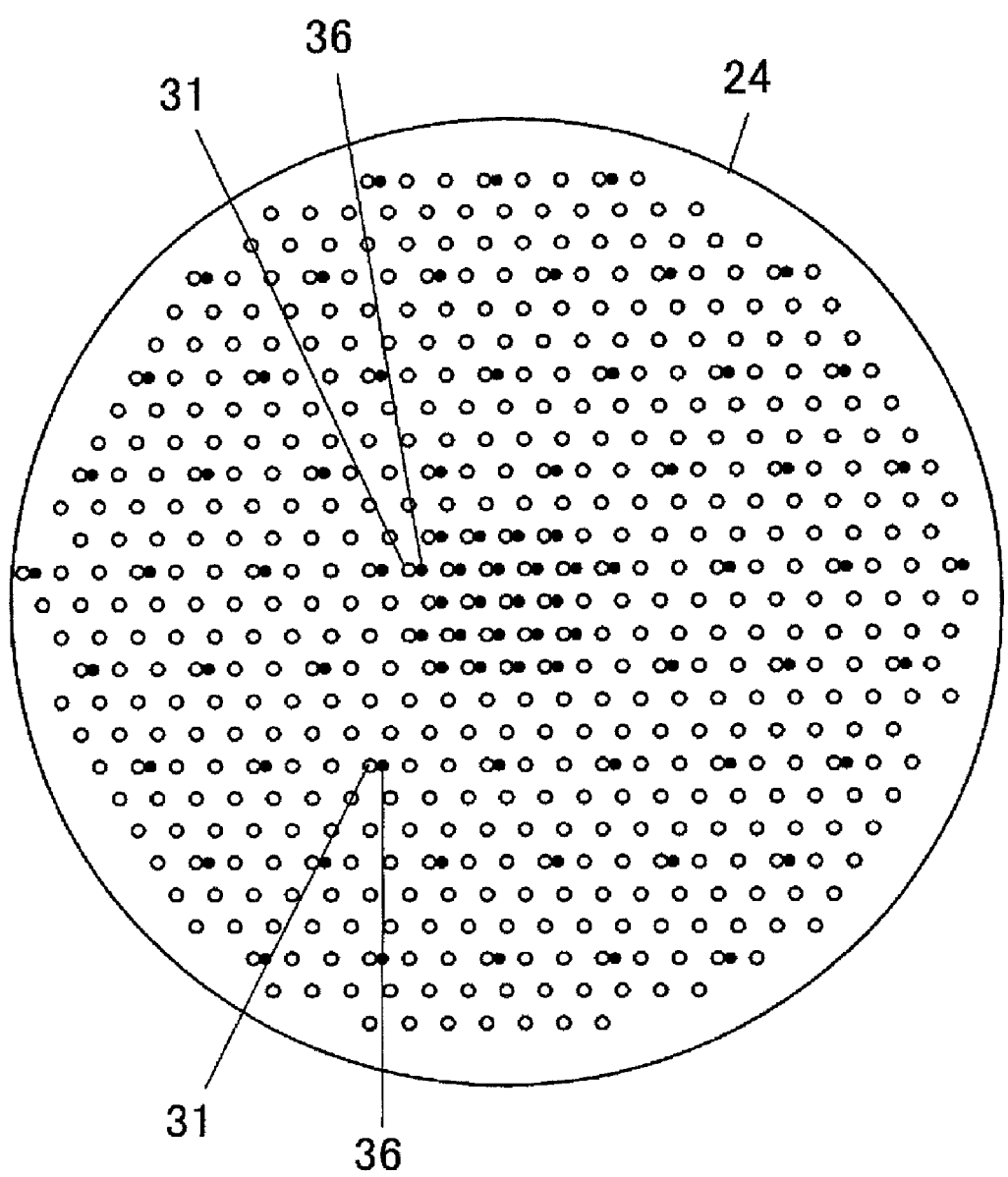
FIG. 18 is a view illustrating a positional relationship among a vibrating electrode plate, acoustic perforations, and projections in an acoustic sensor according to a third embodiment of the present invention when viewed from a direction perpendicular to the vibrating electrode plate.
Figure 19:
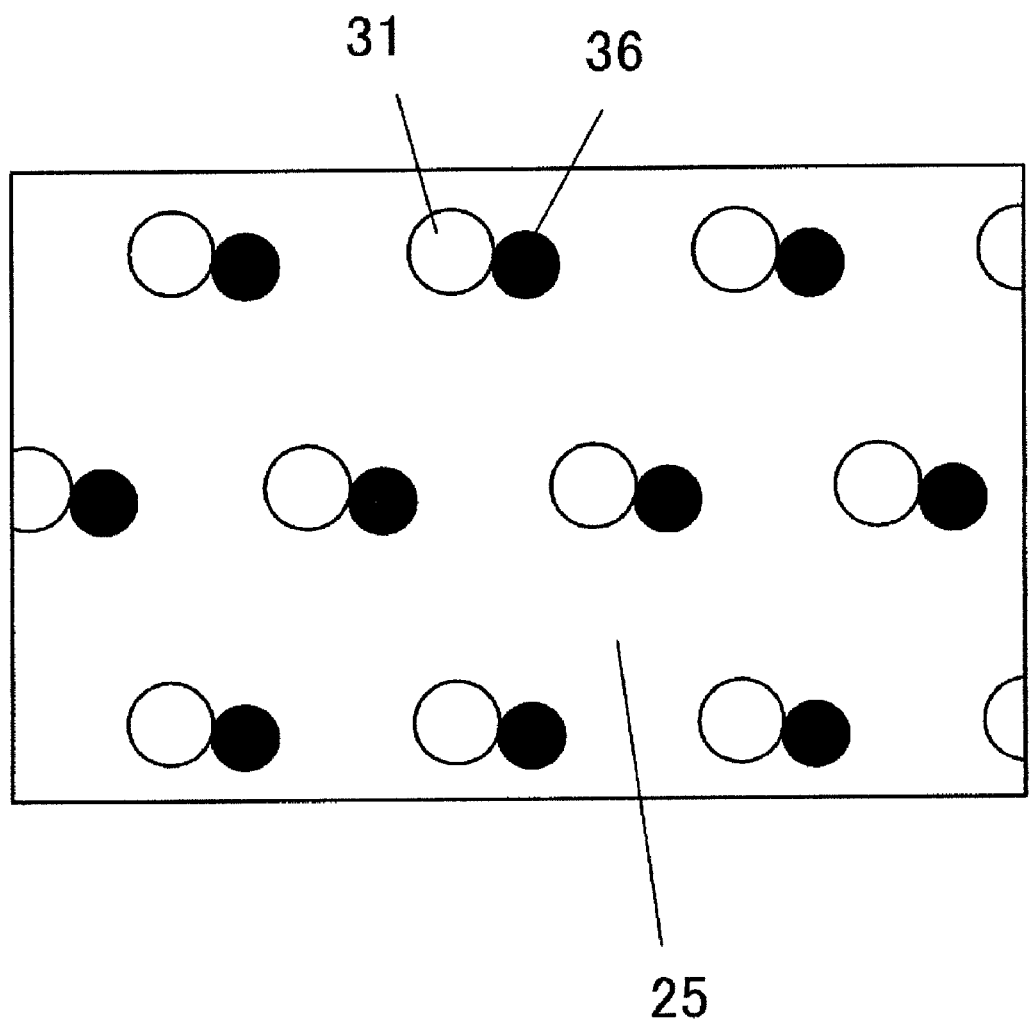
FIG. 19 is a partially enlarged view illustrating a counter electrode plate according to the third embodiment.

FIG. 18 is a view illustrating a positional relationship among the vibrating electrode plate 24, the acoustic perforations 31, and the projections 36, according to a third embodiment, when viewed from a direction perpendicular to the vibrating electrode plate 24. FIG. 19 is a partially enlarged view illustrating the counter electrode plate 25 according to the third embodiment. In this embodiment, the projections 36 are brought close to the acoustic perforations 31 or are brought into contact with the acoustic perforations 31.

Figure 21:
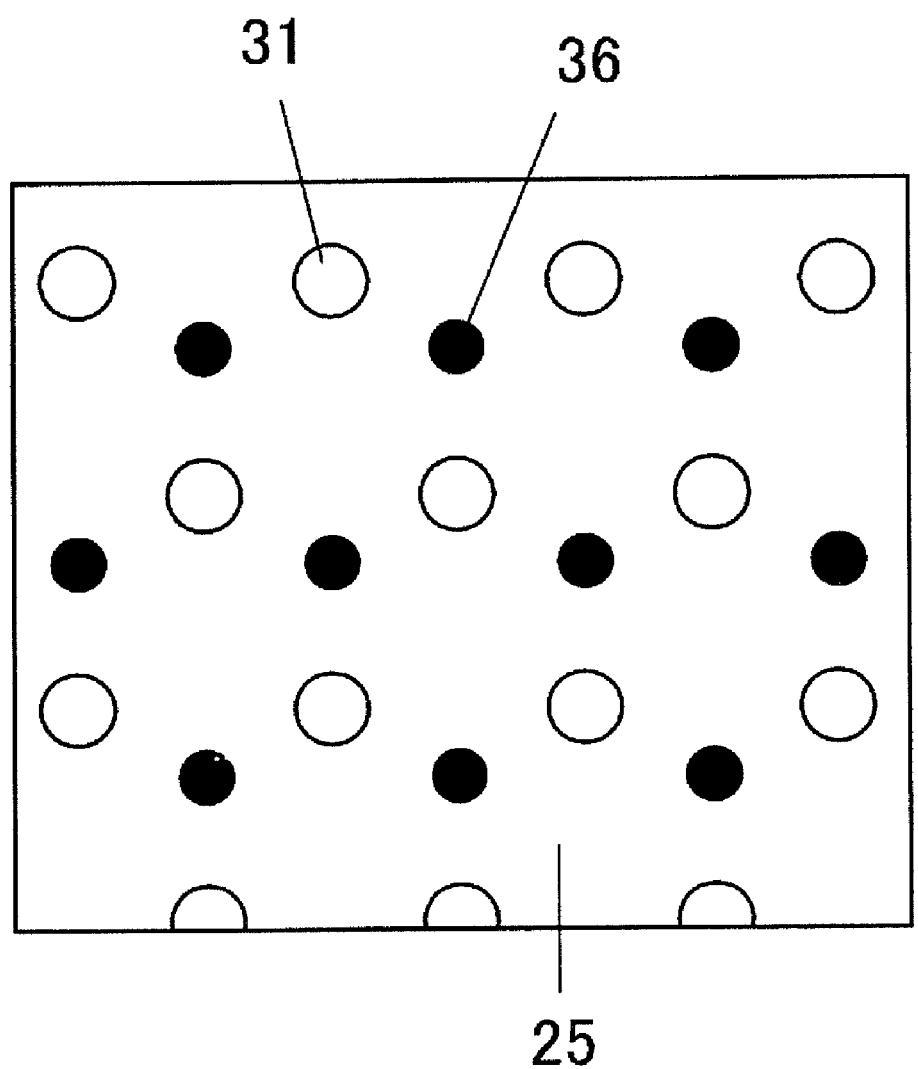
FIG. 21 is a partially enlarged view illustrating the counter electrode plate according to the first and second embodiments.
Figure 22:
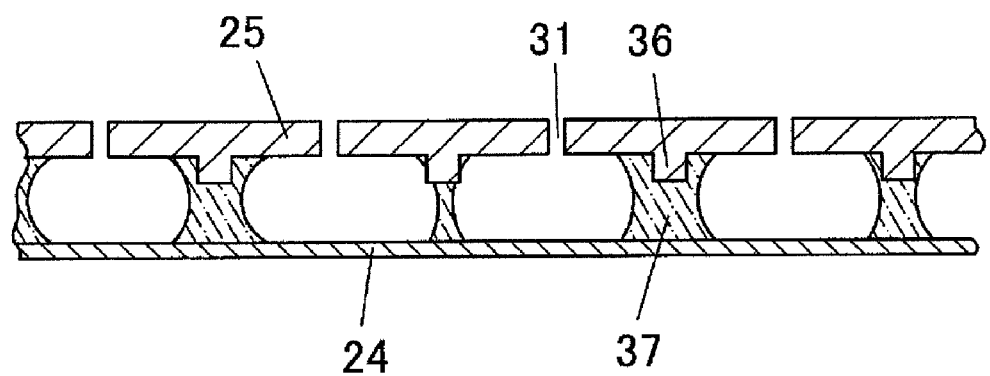
FIG. 22 is a partially enlarged sectional view illustrating a state in which water invading into a micro gap evaporates partially in the acoustic sensor according to the first and second embodiments.

In the first and second embodiments, as illustrated in FIG. 21, the projection 36 is provided in the center of the region surrounded by the acoustic perforations 31. Therefore, the projection 36 is located far away from any of the acoustic perforations 31. When water 37 invading into the micro gap between the vibrating electrode plate 24 and the counter electrode plate 25 evaporates from the acoustic perforations 31, the water 37 remains last at the positions of the projections 36 as illustrated in FIG. 22. Because the gap between the counter electrode plate 25 and the vibrating electrode plate 24 becomes the shortest at the positions of the projections 36, when the water 37 remains at these positions, the large capillary force acts to the last between the vibrating electrode plate 24 and the counter electrode plate 25, and the vibrating electrode plate 24 is hardly separated from the counter electrode plate 25.

Figure 20:
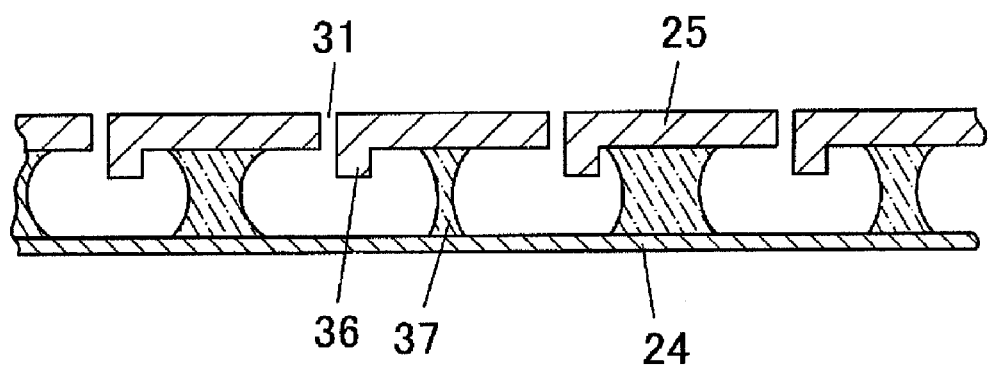
FIG. 20 is a partially enlarged sectional view illustrating a state in which water invading into a micro gap evaporates partially in the acoustic sensor according to the third embodiment.

On the other hand, as illustrated in FIGS. 18 and 19, the projection 36 is located close to the acoustic perforation 31 while being out of the center of the region surrounded by the acoustic perforations 31. Therefore, when the water 37 invading into the micro gap evaporates from the acoustic perforations 31, the water 37 evaporates fastest at the positions of the projection 36s as illustrated in FIG. 20. Thus, the projection 36 does not exist in the place where the water 37 dries last, so that the capillary force acting between the vibrating electrode plate 24 and the counter electrode plate 25 is early decreased and the vibrating electrode plate 24 is easily separated from the counter electrode plate 25.

Figure 23:
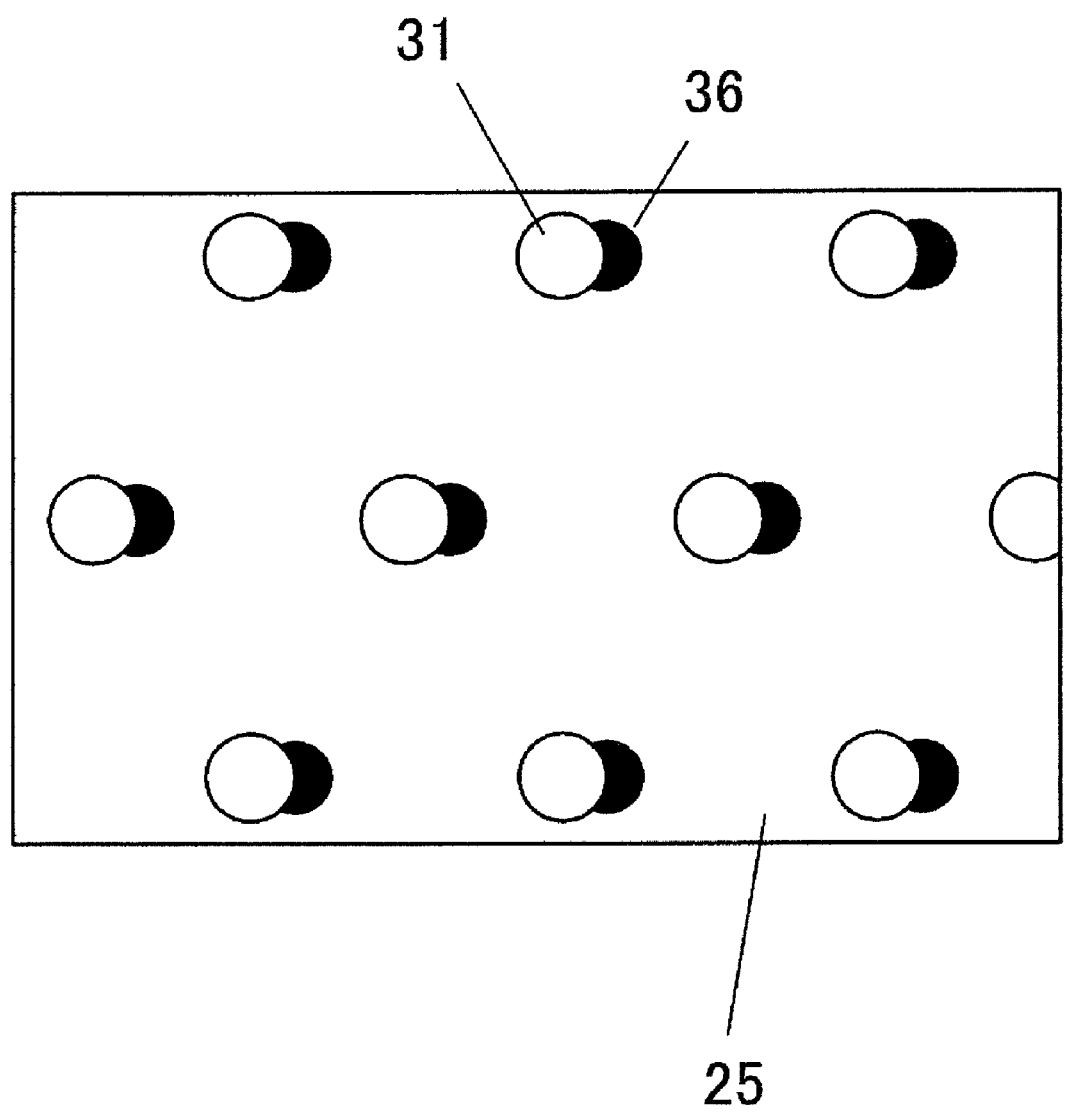
FIG. 23 is a partially enlarged view illustrating a counter electrode plate according to a modification of the third embodiment.
Figure 24:
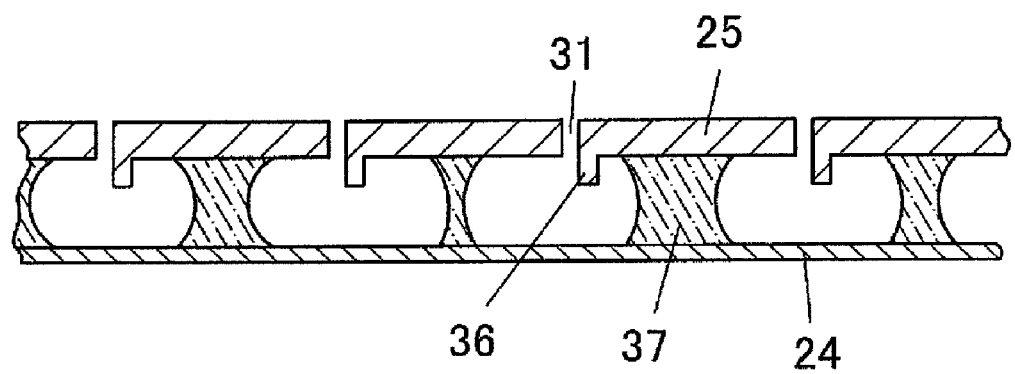
FIG. 24 is a partially enlarged sectional view illustrating a state in which water invading into a micro gap evaporates partially in an acoustic sensor according to modification of the third embodiment.

FIGS. 23 and 24 illustrate a modification of the third embodiment, in which the position of the projection 36 overlaps the position of the acoustic perforation 31. In the case where the position of the projection 36 overlaps the position of the acoustic perforation 31, when the acoustic perforations 31 are formed in the counter electrode plate 25 after the projections 36 are formed, part of the projection 36 is etched while the acoustic perforation 31 is opened by etching. Therefore, the area of the end face of the projection 36 can be reduced to be further smaller than the processing limit of the projection 36, and the effect of reduction of the local sticking or whole sticking is further enhanced.

Other Embodiments

Figure 25:
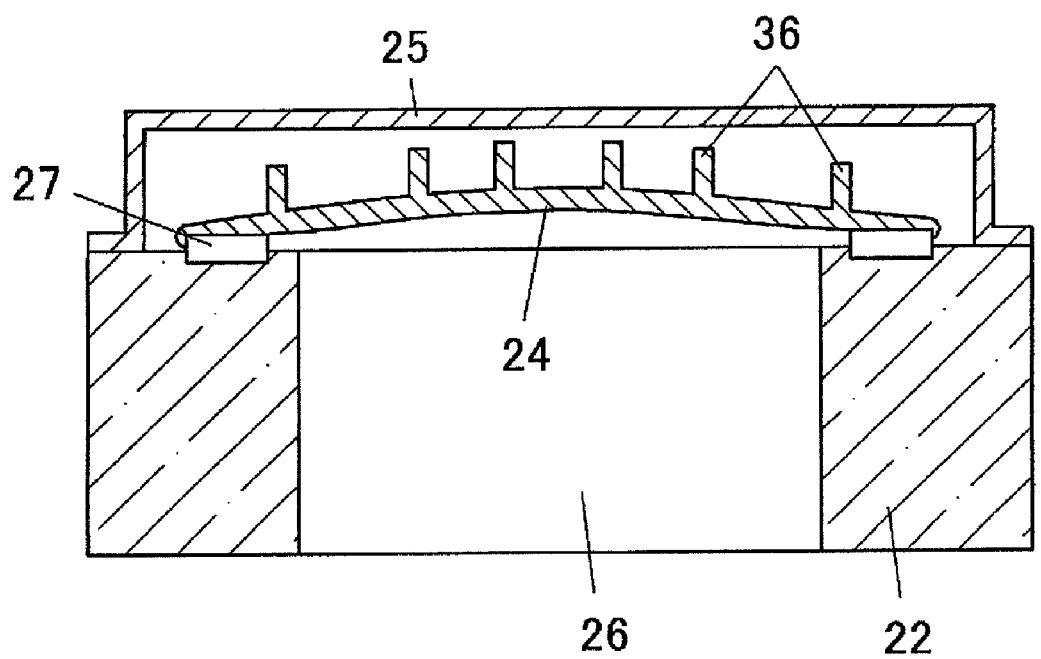
FIG. 25 is a schematic sectional view illustrating an acoustic sensor according to still another embodiment of the present invention.

FIG. 25 is a schematic sectional view illustrating an acoustic sensor according to still another embodiment of the invention. In the first to third embodiments, the projections 36 are provided on the counter electrode plate 25. On the other hand, the projections 36 are provided on the vibrating electrode plate 24 in this embodiment. In this embodiment, it is possible to prevent the local sticking in which the central portion of the vibrating electrode plate 24 deflects to cause the portion between the projections 36 to stick to the counter electrode plate 25 or the whole sticking in which the substantial whole of the projections 36 stick to the counter electrode plate 25.

Figure 26:
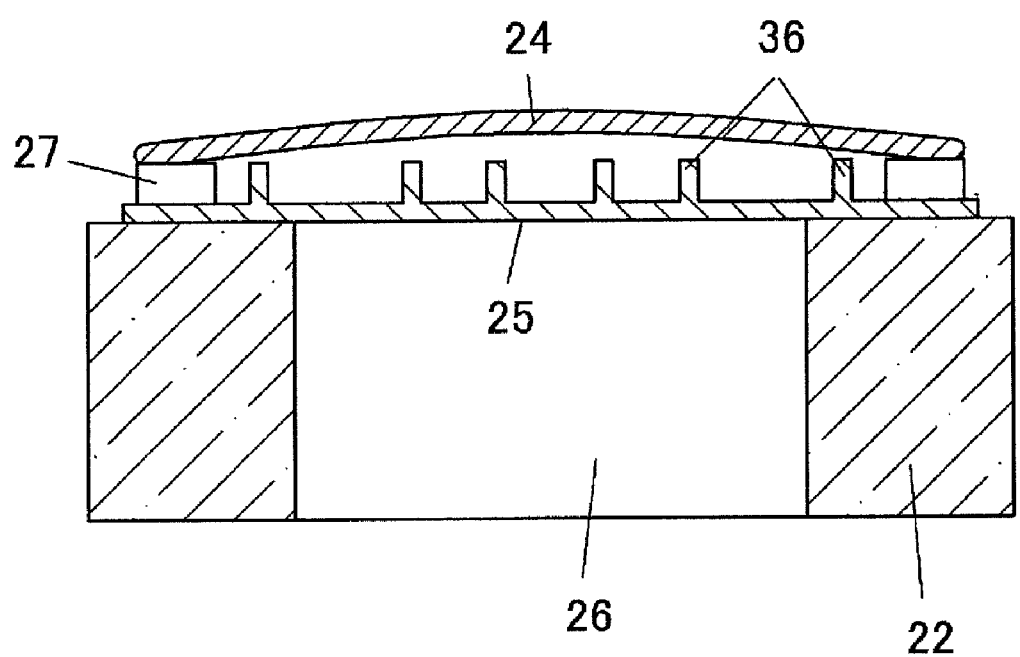
FIG. 26 is a schematic sectional view illustrating an acoustic sensor according to still another embodiment of the present invention.
Figure 27:
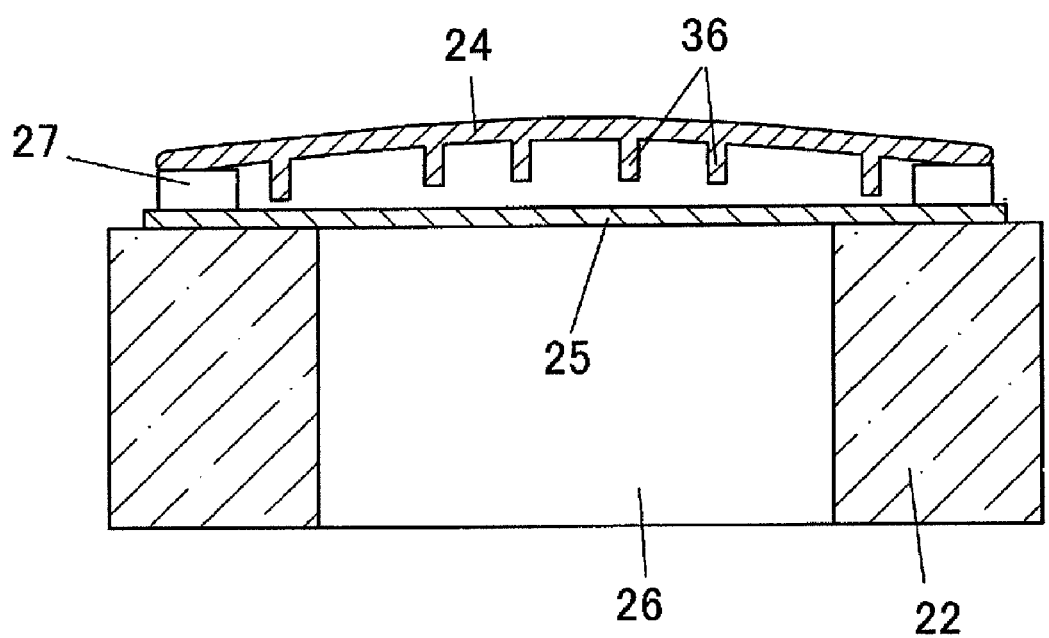
FIG. 27 is a schematic sectional view illustrating an acoustic sensor according to still another embodiment of the present invention.

In the first to third embodiments, the vibrating electrode plate 24 is provided on the silicon substrate 22, and the counter electrode plate 25 is provided thereon to cover. Alternatively, as illustrated in FIGS. 26 and 27, the counter electrode plate 25 may be provided on the silicon substrate 22 and the vibrating electrode plate 24 may be provided thereon. In FIG. 26, the projections 36 are provided on the counter electrode plate 25. In FIG. 27, the projections 36 are provided on the vibrating electrode plate 24.

The invention claimed is:
1. An acoustic sensor comprising:
   a substrate;
   a vibrating electrode plate that is fixed to the substrate to sense a sound pressure; and
   a counter electrode plate that is fixed to the substrate to face the vibrating electrode plate with an air gap interposed therebetween,
   wherein a plurality of projections are provided on a surface on the air gap side of one of the vibrating electrode plate and the counter electrode plate, and
   wherein, in a perpendicular section in a diagonal direction of one of the vibrating electrode plate and the counter electrode plate, each projection comprises a leading end surface and two side surfaces,
      wherein the two side surfaces are perpendicular to the leading end surface and are connected to a same one of the vibrating electrode plate and the counter electrode plate, wherein an interval between the adjacent projections is changed according to a projection forming region in one of the vibrating electrode plate and the counter electrode plate, and wherein, in one of the vibrating electrode plate and the counter electrode plate on which the projections are provided, the interval between the adjacent projections in a high-flexibility region of the vibrating electrode plate or a counter region of the counter electrode plate facing the high-flexibility region is smaller than the interval between the adjacent projections in a low-flexibility region of the vibrating electrode plate or a counter region of the counter electrode plate facing the low-flexibility region.

2. The acoustic sensor according to claim 1, wherein the vibrating electrode plate is fixed to the substrate along an outer circumferential edge of a movable portion of the vibrating electrode plate, and wherein the interval between the adjacent projections in a central portion of the movable portion or a region facing the central portion on the counter electrode plate is smaller than the interval between the adjacent projections in an outer circumferential portion of the movable portion or a region facing the outer circumferential portion on the counter electrode plate.

3. The acoustic sensor according to claim 2, wherein the movable portion of the vibrating electrode plate is formed into a circular disc shape, and wherein the interval between the adjacent projections in a region having a radius from R/8 to R/2 (R being a radius of the movable portion) around a center of the vibrating electrode plate or a region having a radius from R/8 to R/2 around a position facing the center on the counter electrode plate is smaller than the interval between the adjacent projections in a region located outside the region.

4. The acoustic sensor according to claim 1, wherein an outer circumferential portion of the movable portion of the vibrating electrode plate is partially fixed to the substrate at a plurality of points, and wherein the interval between the adjacent projections in a region located between the fixed points on the vibrating electrode plate or a region located between points on the counter electrode plate facing the fixed points is smaller than the interval between the adjacent projections in the remaining projection forming region.

5. The acoustic sensor according to claim 1, wherein the projections are arranged along a plurality of concentric circles or a plurality of polygons.

6. The acoustic sensor according to claim 1, wherein the counter electrode plate includes a plurality of acoustic perforations in order to pass the sound pressure, and wherein each of the projections is disposed in a central portion of a region surrounded by the acoustic perforations.

7. The acoustic sensor according to claim 1, wherein the counter electrode plate includes a plurality of acoustic perforations in order to pass the sound pressure, and wherein each of the projections is disposed out of a center in a region surrounded by the acoustic perforations.

8. The acoustic sensor according to claim 1, wherein the counter electrode plate includes a plurality of acoustic perforations in order to pass the sound pressure, and wherein each of the projections is disposed in a position in contact with the acoustic perforation.

\* \* \* \* \*